(12) United States Patent
Feng et al.

(10) Patent No.: US 12,444,384 B2
(45) Date of Patent: Oct. 14, 2025

(54) DISPLAY SUBSTRATE AND DISPLAY DEVICE OF IMPROVED WIRING

(71) Applicants: Hefei Xinsheng Optoelectronics Technology Co., Ltd., Anhui (CN); BOE Technology Group Co., Ltd., Beijing (CN)

(72) Inventors: Wei Feng, Beijing (CN); Xiaofang Gu, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/681,543

(22) PCT Filed: Sep. 20, 2022

(86) PCT No.: PCT/CN2022/120045
§ 371 (c)(1),
(2) Date: Feb. 6, 2024

(87) PCT Pub. No.: WO2023/124279
PCT Pub. Date: Jul. 6, 2023

(65) Prior Publication Data
US 2025/0131895 A1   Apr. 24, 2025

(30) Foreign Application Priority Data

Dec. 30, 2021   (CN) .......................... 202111648000.9

(51) Int. Cl.
*G09G 3/30*   (2006.01)
*G02F 1/1362*   (2006.01)
(Continued)

(52) U.S. Cl.
CPC ..... *G09G 3/3677* (2013.01); *G02F 1/136204* (2013.01); *G02F 1/136286* (2013.01);
(Continued)

(58) Field of Classification Search
CPC ......... G09G 3/3677; G09G 2310/0286; G09G 2330/04; G02F 1/136204; G02F 1/136286; G02F 1/1368
See application file for complete search history.

(56) References Cited

U.S. PATENT DOCUMENTS

2008/0055505 A1   3/2008   Yeh et al.
2014/0167079 A1   6/2014   Chen et al.
(Continued)

FOREIGN PATENT DOCUMENTS

CN   1945839 A   4/2007
CN   103022052 A   4/2013
(Continued)

OTHER PUBLICATIONS

International Search Report and Written Opinion received for PCT Patent Application No. PCT/CN2022/120045, mailed on Dec. 21, 2022, 19 pages (9 pages of English Translation and 10 pages of Original Document).

*Primary Examiner* — Sanghyuk Park
(74) *Attorney, Agent, or Firm* — ArentFox Schiff LLP; Michael Fainberg

(57) ABSTRACT

A display substrate includes a base substrate having a display region and a bezel region; in the bezel region, a shift register includes an output transistor, a first electrode of the output transistor is an output end of the shift register; a patch panel is between the shift register and the display region, includes a first sub-patch panel on the same layer as the gate of the output transistor; a common electrode wire is between the shift register and the display region, there is a gap
(Continued)

between the common electrode wire and the patch panel; a jumper includes a first sub-jumper and a second sub-jumper, the first sub-jumper is above a layer where the output transistor is, and the second sub-jumper is arranged on a different layer from the first sub-patch panel; the first sub-jumper and the first sub-patch panel overlap each other, the second sub-jumper don't overlap the gap.

20 Claims, 24 Drawing Sheets

(51) Int. Cl.
  *G02F 1/1368* (2006.01)
  *G09G 3/36* (2006.01)
(52) U.S. Cl.
  CPC ... *G02F 1/1368* (2013.01); *G09G 2310/0286* (2013.01); *G09G 2330/04* (2013.01)

(56) References Cited

U.S. PATENT DOCUMENTS

| | | | |
|---|---|---|---|
| 2014/0240889 A1* | 8/2014 | Zheng | H05F 3/02 361/220 |
| 2016/0027797 A1 | 1/2016 | Li | |
| 2017/0293189 A1 | 10/2017 | Ren et al. | |
| 2018/0076233 A1 | 3/2018 | Park | |
| 2018/0180913 A1 | 6/2018 | Yeom et al. | |
| 2019/0155112 A1 | 5/2019 | Cao et al. | |
| 2019/0385998 A1 | 12/2019 | Shi | |
| 2020/0064700 A1 | 2/2020 | Cheng | |
| 2021/0157207 A1* | 5/2021 | Zhang | H10D 86/60 |
| 2022/0130867 A1* | 4/2022 | Xi | G02F 1/13454 |
| 2022/0189948 A1 | 6/2022 | Xu | |

FOREIGN PATENT DOCUMENTS

| | | |
|---|---|---|
| CN | 103165525 A | 6/2013 |
| CN | 104076567 A | 10/2014 |
| CN | 105607366 A | 5/2016 |
| CN | 106169482 A | 11/2016 |
| CN | 206710762 U | 12/2017 |
| CN | 107817634 A | 3/2018 |
| CN | 107833883 A | 3/2018 |
| CN | 207424484 U | 5/2018 |
| CN | 108182921 A | 6/2018 |
| CN | 108254982 A | 7/2018 |
| CN | 109782502 A | 5/2019 |
| CN | 111638617 A | 9/2020 |
| CN | 112310044 A | 2/2021 |
| CN | 113204145 A | 8/2021 |
| KR | 10-2017-0068881 A | 6/2017 |

* cited by examiner

DISPLAY SUBSTRATE AND DISPLAY DEVICE OF IMPROVED WIRING

CROSS REFERENCE TO RELATED APPLICATIONS

The present disclosure is a National Stage of International Application No. PCT/CN2022/120045, filed on Sep. 20, 2022, which claims priority to Chinese Patent Application No. 202111648000.9, entitled "DISPLAY SUBSTRATE AND DISPLAY DEVICE", filed on Dec. 30, 2021 to China National Intellectual Property Administration and incorporated by reference in its entirety.

TECHNICAL FIELD

The present disclosure relates to the technical field of display, in particular to a display substrate and a display device.

BACKGROUND

With the rapid development of display technologies, display panels show a development trend of high integration and low cost. Among them, a gate driver on array (GOA) technology integrates a transistor on a display substrate to realize progressive drive of a gate line through a gate drive circuit, thereby saving wiring spaces for a bonding area of a gate integrated circuit (IC) and a fan-out area of the gate line. Thus, the technology can not only reduce the production cost in terms of material expenses and manufacturing process, and improve the productivity and yield, but also realize symmetrical and narrow-bezel aesthetic design of the display substrate.

SUMMARY

The present disclosure provides a display substrate and a display device. A specific solution is as follows.

In one aspect, an embodiment of the present disclosure provides a display substrate, including:
  a base substrate, including a display region and a bezel region located on at least one side of the display region;
  a shift register, located in the bezel region and including an output transistor, wherein a first electrode of the output transistor is an output end of the shift register;
  a patch panel, located between the shift register and the display region and including a first sub patch panel, wherein the first sub patch panel is arranged on the same layer as a gate of the output transistor;
  a common electrode wire, located between the shift register and the display region, wherein a gap exists between the common electrode wire and the patch panel; and
  a jumper, located in the bezel region and including a first sub jumper and a second sub jumper, wherein the first sub jumper is located on a side, away from the base substrate, of a layer where the output transistor is located, and the second sub jumper is arranged on a different layer from the first sub patch panel; and an orthographic projection of the first sub jumper on the base substrate and an orthographic projection of the first sub patch panel on the base substrate overlap each other, an orthographic projection of the second sub jumper on the base substrate and an orthographic projection of the gap on the base substrate do not overlap each other, the first sub jumper connects the first sub patch panel and the second sub jumper, and the second sub jumper is connected to the first electrode of the output transistor.

In some embodiments, the above display substrate provided by the embodiment of the present disclosure further includes: a second transparent conducting layer located on the side, away from the base substrate, of the layer where the output transistor is located, wherein the first sub jumper is located on the second transparent conducting layer.

In some embodiments, in the above display substrate provided by the embodiment of the present disclosure, the jumper further includes a third sub jumper, an orthographic projection of the third sub jumper on the base substrate and an orthographic projection of the first electrode of the output transistor on the base substrate overlap each other, and the third sub jumper connects the second sub jumper and the first electrode of the output transistor.

In some embodiments, in the above display substrate provided by the embodiment of the present disclosure, the third sub jumper is located on the second transparent conducting layer. In some embodiments, the above display substrate provided by the embodiment of the present disclosure further includes: a first transparent conducting layer mutually insulated from the second transparent conducting layer, wherein the first transparent conducting layer is located between the layer where the output transistor is located and the second transparent conducting layer, and the second sub jumper is located on the first transparent conducting layer.

In some embodiments, in the above display substrate provided by the embodiment of the present disclosure, the first transparent conducting layer further includes: a first connecting electrode and a second connecting electrode, the first connecting electrode is connected to the first sub patch panel through the first sub jumper, the second connecting electrode is connected to the first electrode of the output transistor through the third sub jumper, and the first connecting electrode, the second connecting electrode, and the second sub jumper are integrally arranged.

In some embodiments, in the above display substrate provided by the embodiment of the present disclosure, the second sub jumper is located on the second transparent conducting layer, and the first sub jumper, the second sub jumper, and the third sub jumper are integrally arranged.

In some embodiments, in the above display substrate provided by the embodiment of the present disclosure, the second sub jumper is arranged on the same layer as the first electrode of the output transistor.

In some embodiments, in the above display substrate provided by the embodiment of the present disclosure, the common electrode wire is arranged on the same layer as the first electrode of the output transistor.

In some embodiments, in the above display substrate provided by the embodiment of the present disclosure, the common electrode wire is arranged on the same layer as the gate of the output transistor.

In some embodiments, in the above display substrate provided by the embodiment of the present disclosure, the patch panel further includes a second sub patch panel, the second sub patch panel is arranged on the same layer as the first electrode of the output transistor, and the second sub patch panel is located on a side of the first sub patch panel away from the common electrode wire.

In some embodiments, in the above display substrate provided by the embodiment of the present disclosure, an orthographic projection of the second sub patch panel on the base substrate is located within the orthographic projection of the first sub jumper on the base substrate, and the second sub patch panel is electrically connected to the first sub patch panel through the first sub jumper.

In some embodiments, in the above display substrate provided by the embodiment of the present disclosure, the patch panel is located between the common electrode wire and the display region, the common electrode wire includes a first avoiding groove, and the first avoiding groove is concave in a direction facing away from the patch panel; and an orthographic projection of the first avoiding groove on the base substrate is a first pattern, an orthographic projection of the patch panel on the base substrate is a second pattern, and an orthographic projection of the first pattern on an extension direction of the common electrode wire and an orthographic projection of the second pattern on the extension direction of the common electrode wire overlap each other.

In some embodiments, in the above display substrate provided by the embodiment of the present disclosure, the orthographic projection of the second pattern on the extension direction of the common electrode wire is located within an orthographic projection of a side of the first pattern adjacent to the second pattern on the extension direction of the common electrode wire.

In some embodiments, in the above display substrate provided by the embodiment of the present disclosure, the common electrode wire includes a first avoiding groove, and the first voiding groove is concave in a direction facing away from the display region; and an orthographic projection of the patch panel on the base substrate is located within an orthographic projection of the first avoiding groove on the base substrate.

In some embodiments, in the above display substrate provided by the embodiment of the present disclosure, a width of the first avoiding groove in a direction perpendicular to the extension direction of the common electrode wire is smaller than ½ of a wire width of the common electrode wire on a non-avoiding-groove part.

In some embodiments, in the above display substrate provided by the embodiment of the present disclosure, the first electrode of the output transistor includes a main body part, the gate of the output transistor includes a coupling part, and an orthographic projection of the main body part on the base substrate and an orthographic projection of the coupling part on the base substrate overlap each other.

In some embodiments, in the above display substrate provided by the embodiment of the present disclosure, the coupling part includes a first subsection and a second subsection which are integrally arranged, the first subsection and the second subsection extend in the extension direction of the common electrode wire, and the second subsection is located on a side of the first subsection away from the common electrode wire; and the orthographic projection of the main body part on the base substrate roughly coincides with an orthographic projection of the second subsection on the base substrate.

In some embodiments, in the above display substrate provided by the embodiment of the present disclosure, the first electrode of the output transistor further includes a protruding part, the protruding part and the main body part are integrally arranged, and the protruding part is located on a side of the main body part adjacent to the common electrode wire.

In some embodiments, the above display substrate provided by the embodiment of the present disclosure further includes the second transparent conducting layer located on the side, away from the base substrate, of the layer where the output transistor is located, wherein the jumper further includes the third sub jumper located on the second transparent conducting layer; and the first electrode of the output transistor further includes a separating part, wherein the separating part is located on a side of the protruding part adjacent to the common electrode wire, an orthographic projection of the separating part on the base substrate and an orthographic projection of the protruding part on the base substrate do not overlap each other, and the separating part is connected to the protruding part through the third sub jumper.

In some embodiments, in the above display substrate provided by the embodiment of the present disclosure, the first subsection includes a second avoiding groove, and the second avoiding groove is concave in the direction away from the patch panel;
the orthographic projection of the protruding part on the base substrate is located within an orthographic projection of the first subsection on the base substrate; and
the orthographic projection of the separating part on the base substrate is located within an orthographic projection of the second avoiding groove on the base substrate.

In some embodiments, in the above display substrate provided by the embodiment of the present disclosure, the orthographic projection of the main body part on the base substrate roughly coincides with the orthographic projection of the coupling part on the base substrate.

In some embodiments, the above display substrate provided by the embodiment of the present disclosure further includes the second transparent conducting layer located on the side, away from the base substrate, of the layer where the output transistor is located, wherein the jumper further includes the third sub jumper located on the second transparent conducting layer; the first electrode of the output transistor further includes the separating part; and the main body part includes a connecting region, wherein the connecting region is located on a side of the separating part away from the common electrode wire and is adjacent to the separating part, an orthographic projection of the separating part on the base substrate and an orthographic projection of the connecting region on the base substrate do not overlap each other, and the separating part is connected to the connecting region through the third sub jumper.

In some embodiments, in the above display substrate provided by the embodiment of the present disclosure, the coupling part includes a second avoiding groove, and the second avoiding groove is concave in the direction away from the patch panel; the main body part includes a third avoiding groove, and an orthographic projection of the third avoiding groove on the base substrate roughly coincides with an orthographic projection of the second avoiding groove on the base substrate; and the orthographic projection of the separating part on the base substrate is located within the orthographic projection of the third avoiding groove on the base substrate.

In some embodiments, in the above display substrate provided by the embodiment of the present disclosure, in the extension direction of the common electrode wire, a length of the main body part is greater than a length of the separating part, and in the direction perpendicular to the extension direction of the common electrode wire, a width of the main body part is greater than a width of the separating part.

In some embodiments, in the above display substrate provided by the embodiment of the present disclosure, the second sub jumper includes a first wire and a second wire, the first wire is roughly parallel to the common electrode wire, and the second wire is roughly perpendicular to the common electrode wire; and the first wire is located on a side of the patch panel perpendicular to the extension direction of the common electrode wire, the first wire connects the first sub jumper and the second wire, and the second wire is connected to the first electrode of the output transistor.

In some embodiments, in the above display substrate provided by the embodiment of the present disclosure, the second sub jumper further includes a third wire, the third wire is located on a side of the patch panel away from the common electrode wire, and the third wire is connected to the first wire and the first sub jumper.

In some embodiments, in the above display substrate provided by the embodiment of the present disclosure, the second sub jumper further includes a fourth wire, the fourth wire is arranged on the same side of the patch panel as the first wire, an included angle between the fourth wire and the extension direction of the common electrode wire is an acute angle, and the fourth wire is connected to the first wire and the second wire.

In some embodiments, in the above display substrate provided by the embodiment of the present disclosure, the fourth wire is a straight line or an arc.

In some embodiments, the above display substrate provided by the embodiment of the present disclosure further includes the second transparent conducting layer located on the side, away from the base substrate, of the layer where the output transistor is located, wherein the jumper further includes the third sub jumper located on the second transparent conducting layer, and the second wire is connected to the third sub jumper.

In some embodiments, in the above display substrate provided by the embodiment of the present disclosure, the second sub jumper further includes a fifth wire, the fifth wire is roughly parallel to the common electrode wire, and the fifth wire connects the second wire and the third sub jumper.

In some embodiments, the above display substrate provided by the embodiment of the present disclosure further includes a gate connecting wire, the gate connecting wire is roughly parallel to the first wire, and the gate connecting wire is electrically connected to the first sub patch panel.

In another aspect, an embodiment of the present disclosure provides a display device, including the above display substrate provided by the embodiment of the present disclosure.

In some embodiments, the above display device provided by the embodiment of the present disclosure further includes: an opposing substrate and a liquid crystal layer, wherein the opposing substrate is arranged opposite to the display substrate, and the liquid crystal layer is located between the opposing substrate and the display substrate.

DETAILED DESCRIPTION

Figure 1:
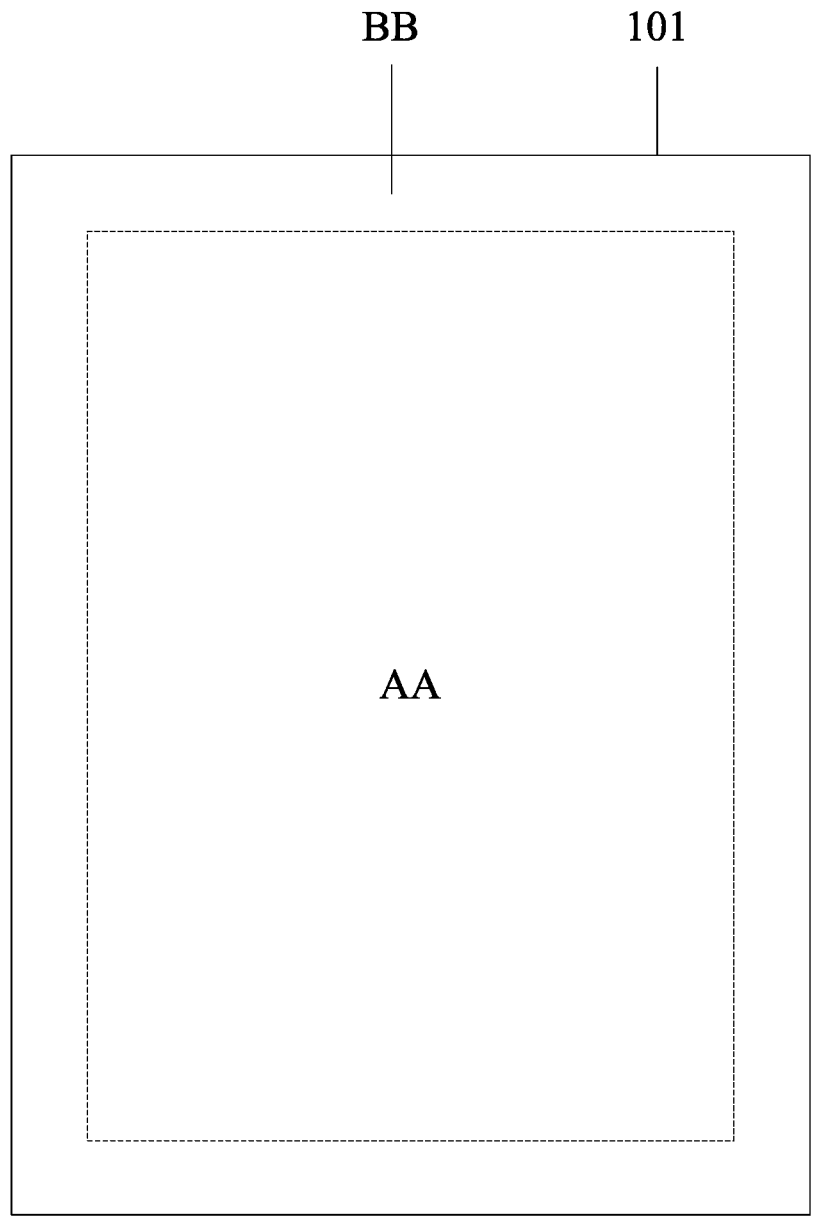
FIG. 1 is a schematic structural diagram of a display substrate provided by an embodiment of the present disclosure.

In order to make the objectives, technical solutions, and advantages of embodiments of the present disclosure clearer, the technical solutions of the embodiments of the present disclosure will be described clearly and completely in conjunction with accompanying drawings of the embodiments of the present disclosure. It should be noted that the size and shape of each figure in the accompanying drawings do not reflect the true ratio, but are only intended to illustrate the content of the present disclosure. Same or similar reference numerals indicate the same or similar elements or elements with the same or similar functions throughout.

Unless otherwise defined, technical or scientific terms used in the present disclosure shall have the common meanings understood by those of ordinary skill in the field to which the present disclosure belongs. "First", "second" and similar words used in the description and the claims of the present disclosure do not indicate any order, quantity or importance, but are only used to distinguish different components. "Include" or "comprise" and other similar words mean that an element or item appearing before the word covers elements or items listed after the word and their equivalents, but does not exclude other elements or items. "Inner", "outer", "up", "down", etc. are only used to indicate the relative position relationship. When an absolute position of a described object changes, the relative position relationship may also change accordingly.

A gate drive circuit in the related art consists of a plurality of shift registers arranged in cascade, and each shift register is electrically connected to a gate line by a patch panel between the shift register and the gate line. Because a common electrode wire is usually arranged between the shift register and the patch panel, it is necessary to arrange a jumper across the common electrode wire to realize the electrical connection between the patch panel and the shift register through the jumper. However, because the common electrode wire and the patch panel share a common gate metal layer, and a distance between the common electrode wire and the patch panel is small due to the need for narrow bezels, electro-static discharge (ESD) is prone to generation between the common electrode wire and the patch panel, which may lead to a broken circuit (GO) in the patch panel. When the jumper (located in a source-drain metal layer) passes through a gap between the common electrode wire and the patch panel, it will be short-circuited to the common electrode wire (Gout and Com short, GCS) due to static electricity, resulting in poor display such as horizontal dark lines and horizontal stripes.

In order to solve the above technical problem in the related art, an embodiment of the present disclosure provides a display substrate, as shown in FIG. 1 to FIG. 7, including:
a base substrate (Glass) 101, including a display region AA and a bezel region BB located on at least one side of the display region AA;
a shift register (GOA), located in the bezel region BB and including an output transistor 102, wherein a first electrode 1021 of the output transistor 102 is an output end (GOUT) of the shift register GOA;
a patch panel 103, located between the shift register (GOA) and the display region AA and including a first sub patch panel 1031, wherein the first sub patch panel 1031 is arranged on a layer same as a layer where a gate 1022 of the output transistor 102 is;
a common electrode wire 104, located between the shift register (GOA) and the display region AA, wherein a gap S exists between the common electrode wire 104 and the patch panel 103 and the gap S is a region prone to generation of static electricity; and
a jumper 105, located in the bezel region BB and including a first sub jumper 1051 and a second sub jumper 1052, wherein the first sub jumper 1051 is located on a side, away from the base substrate 101, of a layer where the output transistor 102 is located, and the second sub jumper 1052 is arranged on a different layer from the first sub patch panel 1031; and an orthographic projection of the first sub jumper 1051 on the base substrate 101 and an orthographic projection of the first sub patch panel 1031 on the base substrate 101 overlap each other, an orthographic projection of the second sub jumper 1052 on the base substrate 101 and an orthographic projection of the gap S on the base substrate 101 do not overlap each other, the first sub jumper 1051 connects the first sub patch panel 1031 and the second sub jumper 1052, and the second sub jumper 1052 is connected to the first electrode 1021 of the output transistor 102.

In the above display substrate provided by the embodiment of the present disclosure, the first sub jumper 1051 and the first sub patch panel 1031 are arranged in an overlapping mode and the orthographic projection of the second sub jumper 1052 on the base substrate 101 and the orthographic projection of the gap S on the base substrate 101 do not overlap each other, so that the jumper 105 including the first sub jumper 1051 and the second sub jumper 1052 bypasses the gap S between the common electrode wire 104 and the patch panel 103. Therefore, the jumper 105 is prevented from being short-circuited to the common electrode wire 104 due to an electrostatic interaction and display quality is improved.

It should be noted that in the present disclosure, both "arranged on the same layer" and "located on the . . . layer" refer to a film layer and a layer structure formed through the same film formation process for manufacturing a specific figure, and formed by a one-time composition process through the same mask. That is, the one-time composition process corresponds to one mask (also known as a photomask). According to a difference of particular figures, the one-time composition process may include multiple exposure, development, or etching processes, and the specific figure in the formed layer structure may be continuous or discontinuous; and these specific figures may be at the same height or have the same thickness, or may be at different heights or have different thicknesses.

Optionally, the output transistor 102 provided by the embodiment of the present disclosure may be a thin film transistor (TFT) or a metal-oxide-semiconductor field-effect transistor (MOS), which is not limited herein. In specific implementation, the first electrode 1021 of the output transistor 102 may be a source electrode or a drain electrode. The output transistor 102 may be a P type transistor or an N type transistor. In specific implementation, the P type transistor is conducted when a relation between a voltage difference $V_{gs}$ between the gate thereof and the source electrode thereof and a threshold voltage $V_{th}$ thereof satisfies $V_{gs}<V_{th}$, and is cut off when the relation satisfies $V_{gs} \geq V_{th}$; and the N type transistor is conducted when a relation between a voltage difference $V_{gs}$ between the gate thereof and the source electrode thereof and a threshold voltage $V_{th}$ thereof satisfies $V_{gs}>V_{th}$, and is cut off when the relation satisfies $V_{gs} \leq V_{th}$. In addition, an active layer of the output transistor 102 may be an amorphous silicon (a-Si) active layer, a polycrystalline silicon (P-Si) active layer or an oxide (IGZO) active layer, which is not limited herein.

In some embodiments, as shown in FIG. 8 to FIG. 12, the above display substrate provided by the embodiment of the present disclosure may further include: a second transparent conducting layer (2ITO) located on the side, away from the base substrate 101, of the layer where the output transistor 102 is located, wherein the first sub jumper 1051 is located on the second transparent conducting layer (2ITO). An electrical connection between the first electrode 1021 located on the output transistor 102 and the first sub patch panel 1031 located on a layer (Gate) where the gate 1022 of the output transistor 102 is located may be realized through the first sub jumper 1051 located on the second transparent conducting layer (2ITO), so a one-time masking process (GI mask) on a gate insulation layer (GI) 106 is prevented.

In some embodiments, in the above display substrate provided by the embodiment of the present disclosure, as shown in FIG. 1 to FIG. 7, the jumper 105 may further include a third sub jumper 1053, an orthographic projection of the third sub jumper 1053 on the base substrate 101 and an orthographic projection of the first electrode 1021 of the output transistor 102 on the base substrate 101 overlap each other, and the third sub jumper 1053 connects the second sub jumper 1052 and the first electrode 1021 of the output transistor 102, so that the jumper 105 bypasses the gap S between the common electrode wire 104 and the patch panel 103. Therefore, the jumper 105 is prevented from being short-circuited to the common electrode wire 104 due to the electrostatic interaction and the display quality is improved.

In some embodiments, in the above display substrate provided by the embodiment of the present disclosure, as shown in FIG. 8 to FIG. 12, the third sub jumper 1053 may be located on the second transparent conducting layer (2ITO), so the one-time masking process (GI mask) on the gate insulation layer (GI) 106 is prevented.

Continuously referring to FIG. 8 to FIG. 12, the above display substrate provided by the embodiment of the present disclosure may further include: a first transparent conducting layer (1ITO) mutually insulated from the second transparent conducting layer (2ITO), wherein the first transparent conducting layer (1ITO) is located between the layer where the output transistor 102 is located and the second transparent conducting layer (2ITO); and a first insulation layer (PVX1) 107 and a flat layer (Organic) 108 are arranged between the source-drain metal layer (i.e., a layer where the first electrode 1021 of the output transistor 102 is located, SD) and the first transparent conducting layer (1ITO), and a second insulation layer (PVX2) 109 is arranged between the first transparent conducting layer (1ITO) and the second transparent conducting layer (2ITO). The first sub jumper 1051 may be electrically connected to the first sub patch panel 1031 through at least one first via hole penetrating through the second insulation layer 109, the flat layer 108, the first insulation layer 107, and the gate insulation layer 106; and the third sub jumper 1053 may be electrically connected to the first electrode 1021 of the output transistor 102 through at least one second via hole penetrating through the second insulation layer 109, the flat layer 108, and the first insulation layer 107. In addition, in the case of a plurality of first via holes, a contact resistance between the first sub jumper 1051 and the first sub patch panel 1031 may be effectively reduced, and optionally, the plurality of first via holes may be formed in one row. Similarly, in the case of a plurality of second via holes, a contact resistance between the third sub jumper 1053 and the first electrode 1021 of the output transistor 102 may be effectively reduced, and optionally, the plurality of second via holes may be formed in one row.

In some embodiments, in the above display substrate provided by the embodiment of the present disclosure, as shown in FIG. 8, FIG. 9, FIG. 13, and FIG. 14, the second sub jumper 1052 may be located on the first transparent conducting layer (1ITO). In the related art, the jumper 105 is usually located on the source-drain metal layer, and an electrical connection between the jumper 105 and the patch panel 103 is realized by adding a via hole penetrating through the gate insulation layer 106. Normally, one of the first transparent conducting layer (1ITO) and the second transparent conducting layer (2ITO) serves as a layer where a pixel electrode is located and the other serves as a layer where a common electrode is located. When the first transparent conducting layer (1ITO) serves as the layer where the pixel electrode is located, the pixel electrode needs to realize electrical connection to the first electrode 1021 of a switching transistor through via holes penetrating through the first insulation layer 107 and the flat layer 108; and when the second transparent conducting layer (2ITO) serves as the layer where the pixel electrode is located, the pixel electrode needs to realize electrical connection to the switching transistor through via holes penetrating through the first insulation layer 107, the flat layer 108, and the second insulation layer 109. Specifically, when the first transparent conducting layer (1ITO) serves as the layer where the pixel electrode is located, the via holes penetrating through the flat layer 108 and the first insulation layer 107 may be manufactured simultaneously, and then the pixel electrode of the first transparent conducting layer (1ITO) is manufactured to realize the electrical connection between the pixel electrode and the switching transistor; and when the second transparent conducting layer (2ITO) serves as the layer where the pixel electrode is located, the via hole of the flat layer 108 may be manufactured first, the common electrode of the first transparent conducting layer (1ITO) is manufactured, then positions in the first insulation layer 107 and the second insulation layer 108 corresponding to the via hole in the flat layer 108 are perforated, and finally the pixel electrode of the second transparent conducting layer (2ITO) is manufactured to realize the electrical connection between the pixel electrode and the base substrate. However, static electricity may be introduced when a mask of the flat layer 108 and masks (VIA masks) of the first insulation layer 107 and second insulation layer 108 for the via hole for the electrical connection of the pixel electrode are manufactured, the gate insulation layer 106 may be punctured, so in the related art, a short circuit between the jumper 105 of the source-drain metal layer and the common electrode wire 104 of the gate metal layer (i.e., the layer where the gate 1022 of the output transistor 102 is located) may be caused, thus leading to poor display. Because the first transparent conducting layer (1ITO) is manufactured after a manufacturing process of the via hole in the flat layer 108, in the present disclosure, the second sub jumper 1052 located on the first transparent conducting layer (1ITO) is not affected by the static electricity introduced into the mask for manufacturing the via hole in the flat layer 108, so the short circuit between the second sub jumper 1052 and the common electrode wire 104 may be effectively avoided.

In some embodiments, in the above display substrate provided by the embodiment of the present disclosure, as shown in FIG. 8 to FIG. 12, the first transparent conducting layer (1ITO) may further include: a first connecting electrode 110 and a second connecting electrode 111, the first connecting electrode 110 is connected to the first sub patch panel 1031 through the first sub jumper 1051, the second connecting electrode 111 is connected to the first electrode 1021 of the output transistor 102 through the third sub jumper 1053, and the first connecting electrode 110, the second connecting electrode 111, and the second sub jumper 1052 are integrally arranged. In this way, the first sub patch panel 1031 realizes electrical connection to the first electrode 1021 of the output transistor 102 through the first sub jumper 1051, the first connecting electrode 110, the second sub jumper 1052, the second connecting electrode 111, and the third sub jumper 1053 successively.

Specifically, as shown FIG. 8 to FIG. 12, the first sub jumper 1051 may be electrically connected to the first connecting electrode 110 through as least one third via hole penetrating through the second insulation layer 109, and the third sub jumper 1053 may be electrically connected to the second connecting electrode 111 through at least one fourth via hole penetrating through the second insulation layer 109. In addition, in the case of a plurality of third via holes, a contact resistance between the first sub jumper 1051 and the first connecting electrode 110 may be effectively reduced, and optionally, the plurality of third via holes may be formed in one row. Similarly, in the case of a plurality of fourth via holes, a contact resistance between the third sub jumper 1053 and the second connecting electrode 111 may be effectively reduced, and optionally, the plurality of fourth via holes may be formed in one row.

In some embodiments, in the above display substrate provided by the embodiment of the present disclosure, as shown in FIG. 15 to FIG. 22, the second sub jumper 1052 may be located on the second transparent conducting layer (2ITO), and the first sub jumper 1051, the second sub jumper 1052, and the third sub jumper 1053 are integrally arranged. Because the second transparent conducting layer (2ITO) is manufactured after a manufacturing process of the above via hole for electrical connection of the pixel electrode, in the present disclosure, the second sub jumper 1052 located on the second transparent conducting layer (2ITO) is not affected by the static electricity introduced when the mask of the flat layer 108 and masks (VIA masks) of the first insulation layer 107 and second insulation layer 108 for the via hole for the electrical connection of the pixel electrode are manufactured, so the short circuit between the second sub jumper 1052 and the common electrode wire 104 may be effectively avoided.

Figure 2:
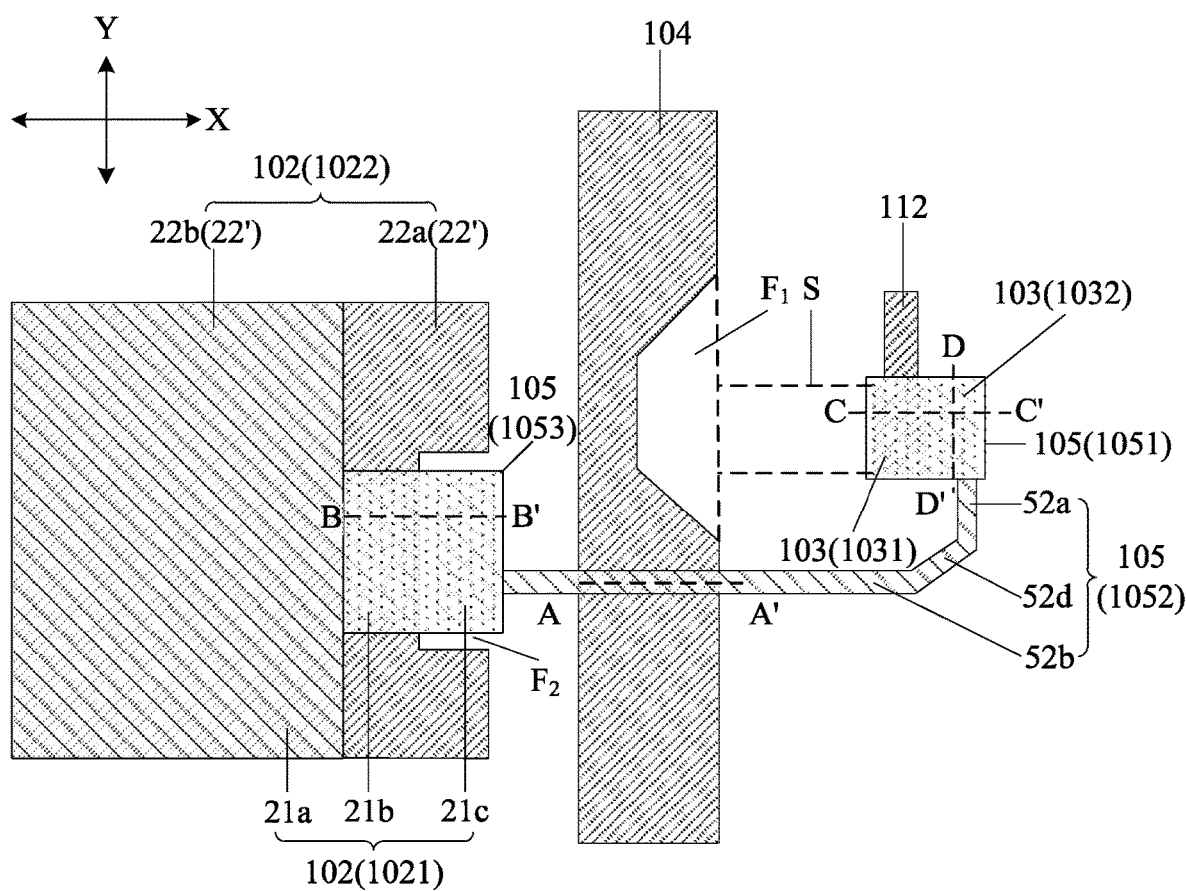
FIG. 2 is a schematic diagram of a connection of an output transistor and a patch panel provided by an embodiment of the present disclosure.
Figure 3:
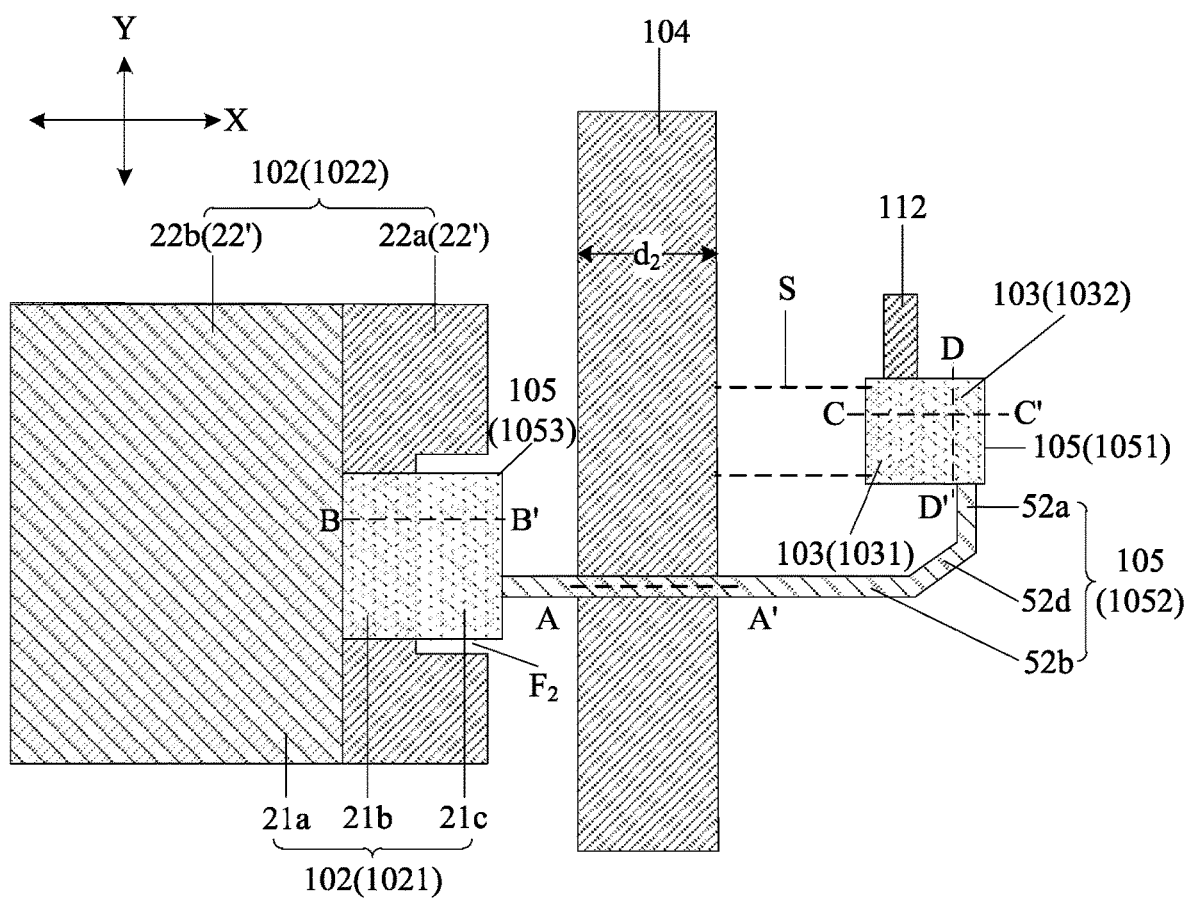
FIG. 3 is another schematic diagram of a connection of an output transistor and a patch panel provided by an embodiment of the present disclosure.
Figure 4:
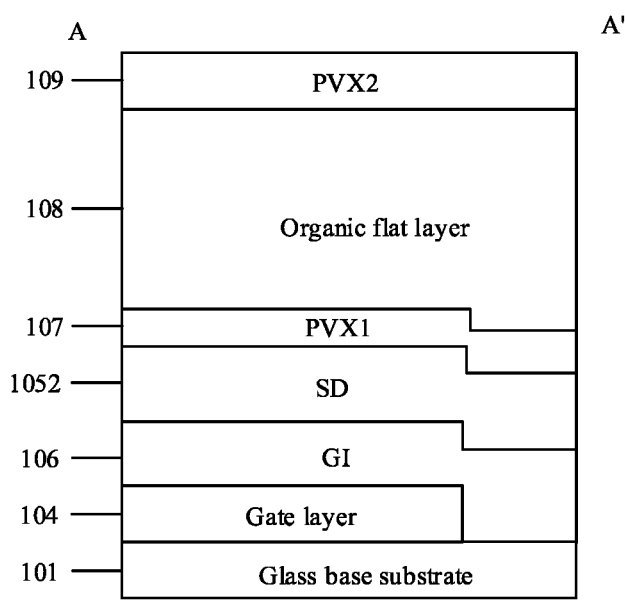
FIG. 4 is a sectional diagram along an A-A' line in FIG. 2 and FIG. 3.
Figure 5:
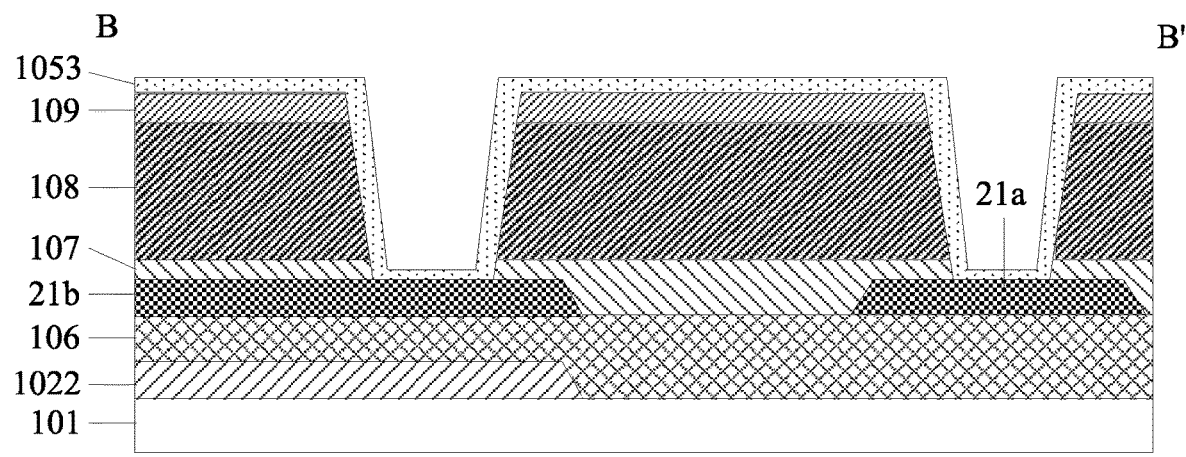
FIG. 5 is a sectional diagram along a B-B' line in FIG. 2 and FIG. 3.
Figure 6:
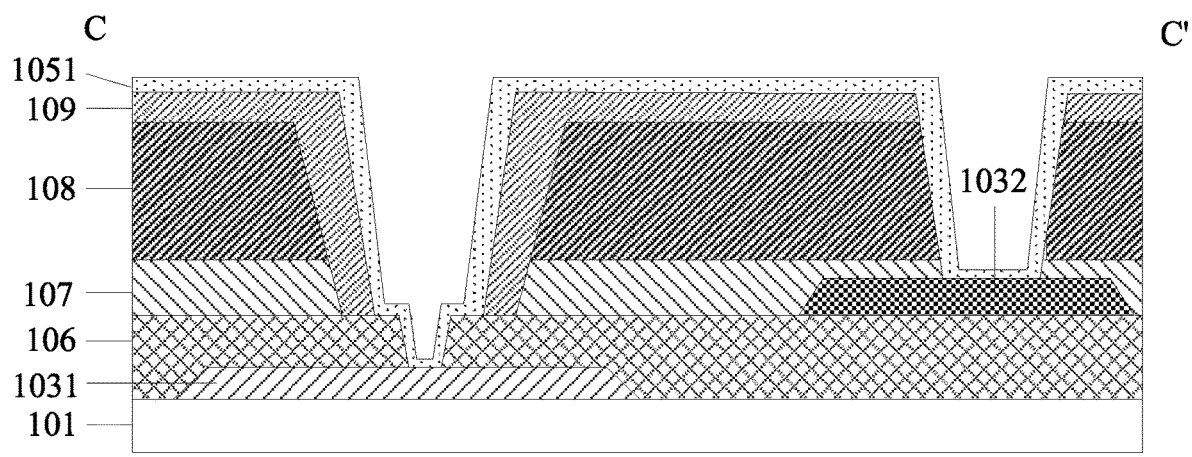
FIG. 6 is a sectional diagram along a C-C' line in FIG. 2 and FIG. 3.
Figure 7:
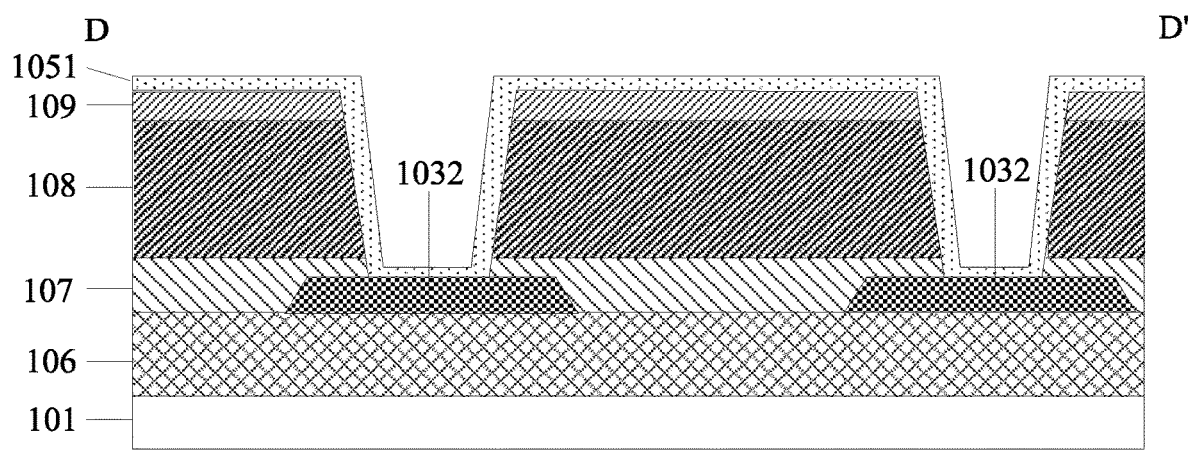
FIG. 7 is a sectional diagram along a D-D' line in FIG. 2 and FIG. 3.
Figure 8:
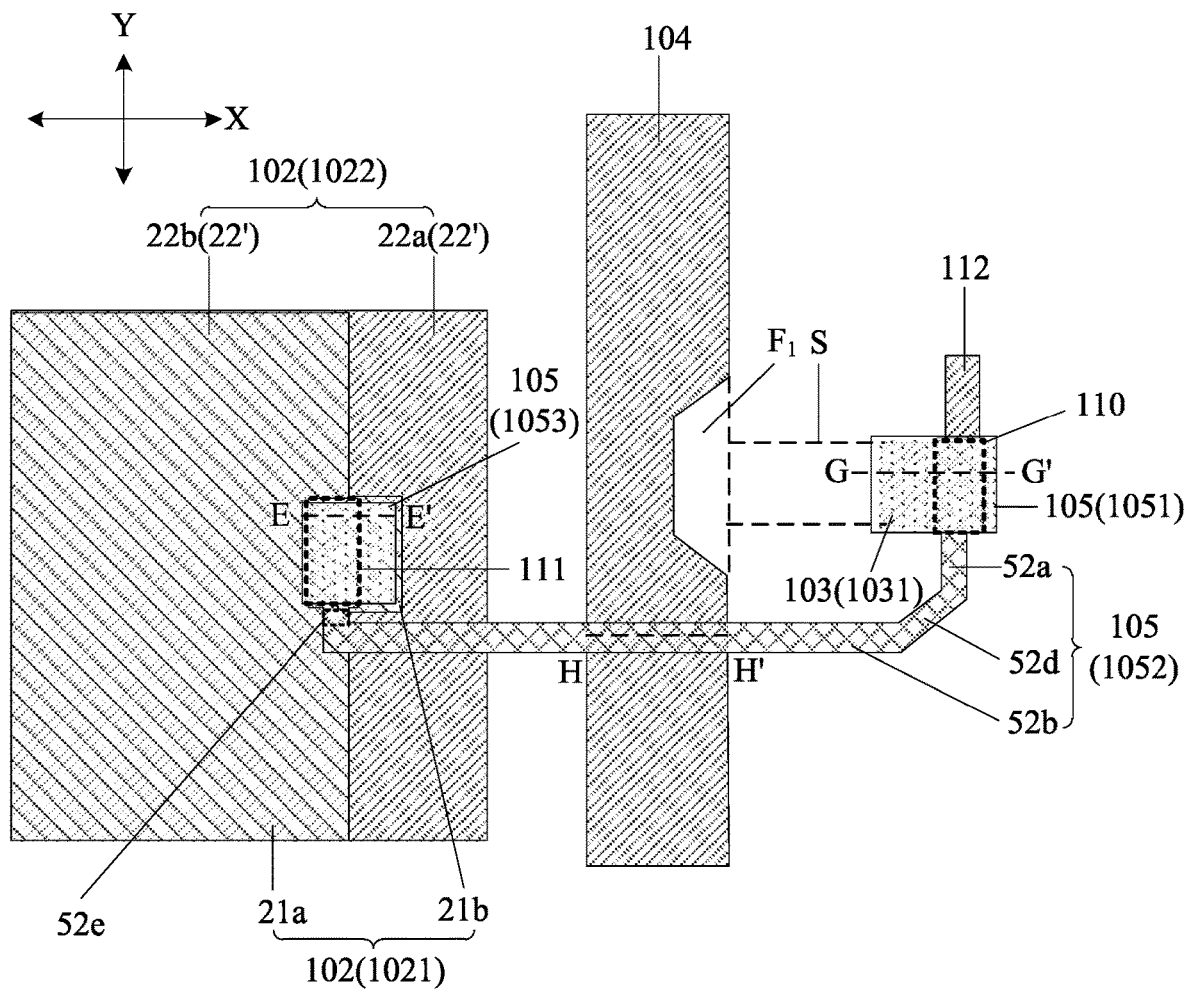
FIG. 8 is yet another schematic diagram of a connection of an output transistor and a patch panel provided by an embodiment of the present disclosure.

In some embodiments, in the above display substrate provided by the embodiment of the present disclosure, as shown in FIG. 2 to FIG. 4, the second sub jumper 1052 may be arranged on a layer same as a layer where the first electrode 1021 of the output transistor 102 is. Because the second sub jumper 1052 bypasses the gap S which is prone to generation of static electricity between the common electrode wire 104 and the first patch panel 1031, the second sub jumper 1052 is not affected by the static electricity at the gap S, so the second sub jumper 1052 may be arranged on the layer (i.e., the source-drain metal layer) where the first electrode 1021 of the output transistor 102 is located.

In some embodiments, in the above display substrate provided by the embodiment of the present disclosure, as shown in FIG. 9, FIG. 14, FIG. 18, and FIG. 22, the common electrode wire 104 is arranged on the layer same as a layer where the first electrode 1021 of the output transistor 102 is. Because in the related art, the common electrode wire 104 and the patch panel 103 are located on the gate metal layer (i.e., a layer where the gate 1022 of the output transistor 102 is located) and are close to each other, static electricity is easily generated between the two. In the present disclosure, the common electrode wire 104 is arranged on the layer (i.e., the source-drain metal layer) where the first electrode 1021 of the output transistor 102 is located, so the common electrode wire 104 is arranged on a layer different from the first sub patch panel 1031 located on the gate metal layer, and static electricity will not be generated.

In some embodiments, in the above display substrate provided by the embodiment of the present disclosure, as shown in FIG. 2 to FIG. 4, FIG. 8, FIG. 13, FIG. 15, and FIG. 16, the common electrode wire 104 is arranged on the same layer as the gate 1022 of the output transistor 102. Because the second sub jumper 1052 bypasses the gap S which is prone to generation of static electricity between the common electrode wire 104 and the first patch panel 1031, even if the common electrode wire 104 is arranged on the layer same as a layer where the gate 1022 of the output transistor 102 is, the second sub jumper 1052 is not affected by the static electricity at the gap S. In the meantime, the common electrode wire 104 is arranged on the same layer as the gate 1022 of the output transistor 102, so a process of manufacturing the common electrode wire 104 in the related art is not changed and good compatibility is ensured.

Figure 15:
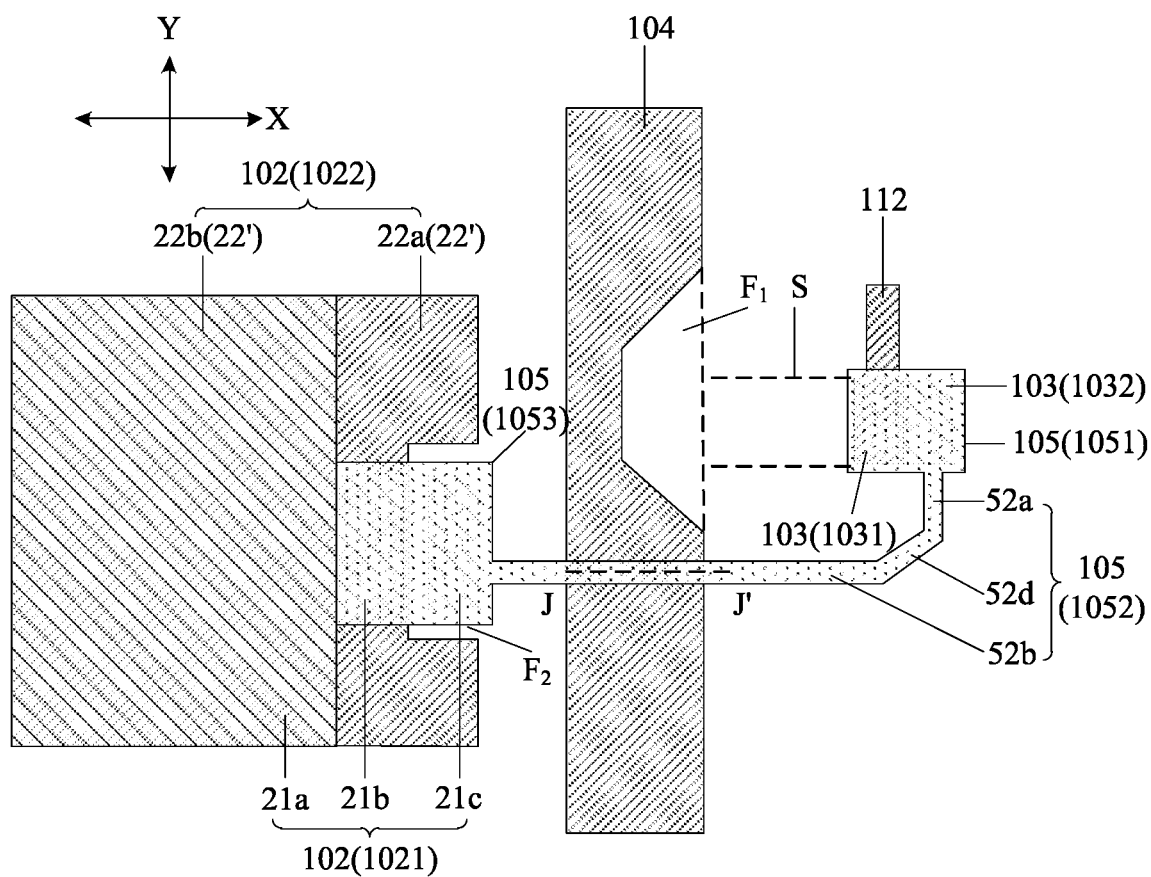
FIG. 15 is yet another schematic diagram of a connection of an output transistor and a patch panel provided by an embodiment of the present disclosure.
Figure 16:
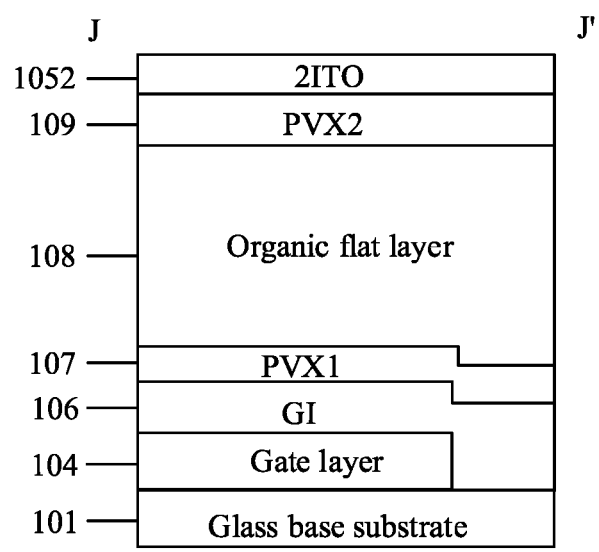
FIG. 16 is a sectional diagram along a J-J' line in FIG. 15.
Figure 17:
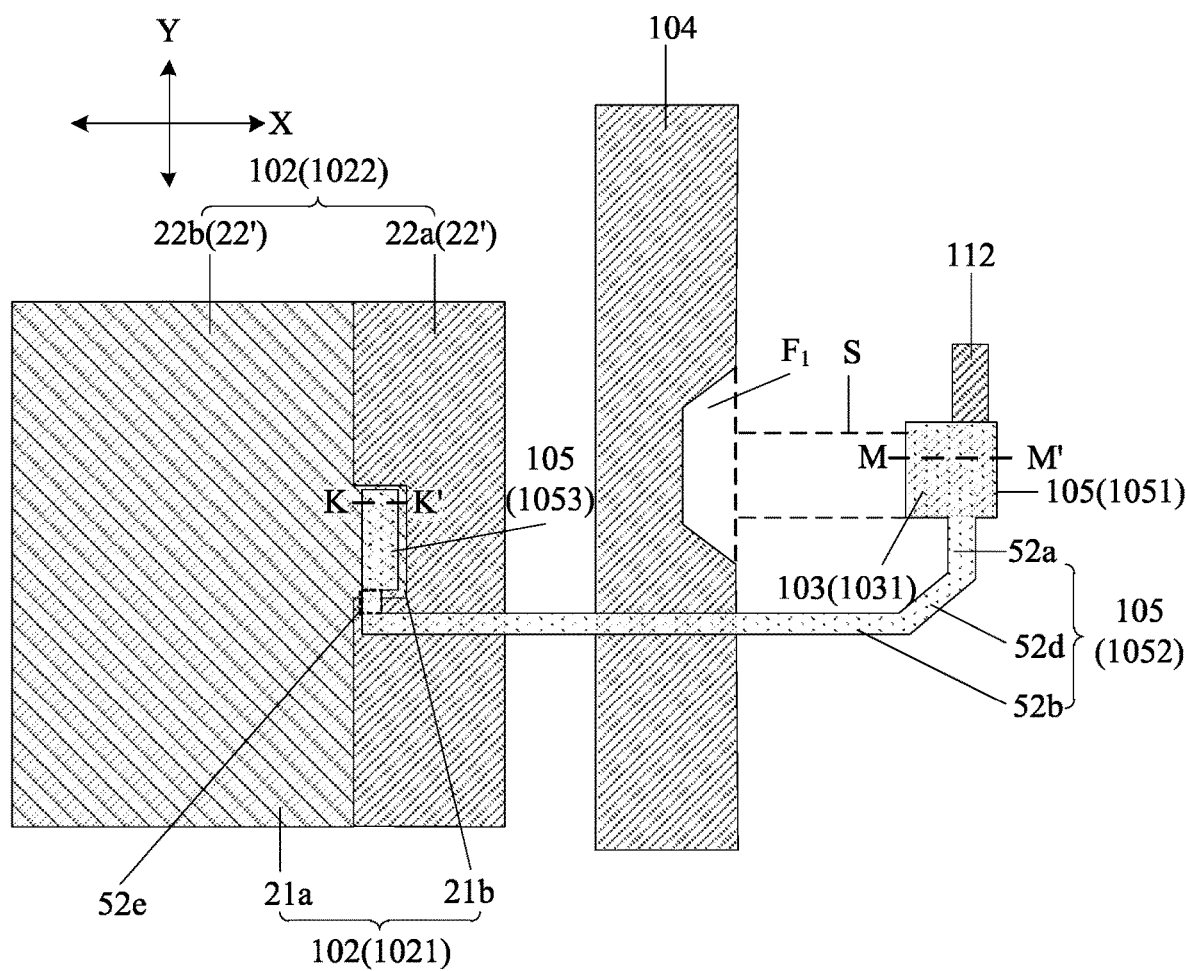
FIG. 17 is yet another schematic diagram of a connection of an output transistor and a patch panel provided by an embodiment of the present disclosure.

In some embodiments, in the above display substrate provided by the embodiment of the present disclosure, as shown in FIG. 2, FIG. 3, and FIG. 15, the patch panel 103 may further include a second sub patch panel 1032, the second sub patch panel 1032 is arranged on the layer same as a layer where the first electrode 1021 of the output transistor 102 is, and the second sub patch panel 1032 is located on a side of the first sub patch panel 1031 away from the common electrode wire 104. Because the gap S which is prone to generation of static electricity is located on a side of the first sub patch panel 1031 adjacent to the common electrode wire 104, by arranging the second sub patch panel 1032 on the side of the first sub patch panel 1031 away from the common electrode wire 104, the second sub patch panel 1032 located on the same layer as the first electrode 1021 of the output transistor 102 effectively bypasses a region prone to generation of static electricity and is not affected by static electricity. Therefore, a problem of short circuit between the second sub patch panel 1032 and the common electrode wire 104 will not be caused, so no influence will be imposed on display of a product.

In some embodiments, in the above display substrate provided by the embodiment of the present disclosure, as shown in FIG. 2, FIG. 3, and FIG. 15, an orthographic projection of the second sub patch panel 1032 on the base substrate 101 is located within the orthographic projection of the first sub jumper 1051 on the base substrate 101, and the second sub patch panel 1032 is electrically connected to the first sub patch panel 1031 through the first sub jumper 1051. Specifically, the first sub jumper 1051 may be electrically connected to the second patch panel 1032 through at least one fifth via hole penetrating through the second insulation layer 109, the flat layer 108, and the first insulation layer 107. In the case of a plurality of fifth via holes, a contact resistance between the first sub jumper 1051 and the second sub patch panel 1032 may be effectively reduced, and optionally, the plurality of fifth via holes may be formed in one row. Optionally, when the first sub jumper 1051 is electrically connected to the first sub patch panel 1031 through a row of first via holes, the first via holes and the fifth via holes are formed into two rows of via holes.

Figure 23:
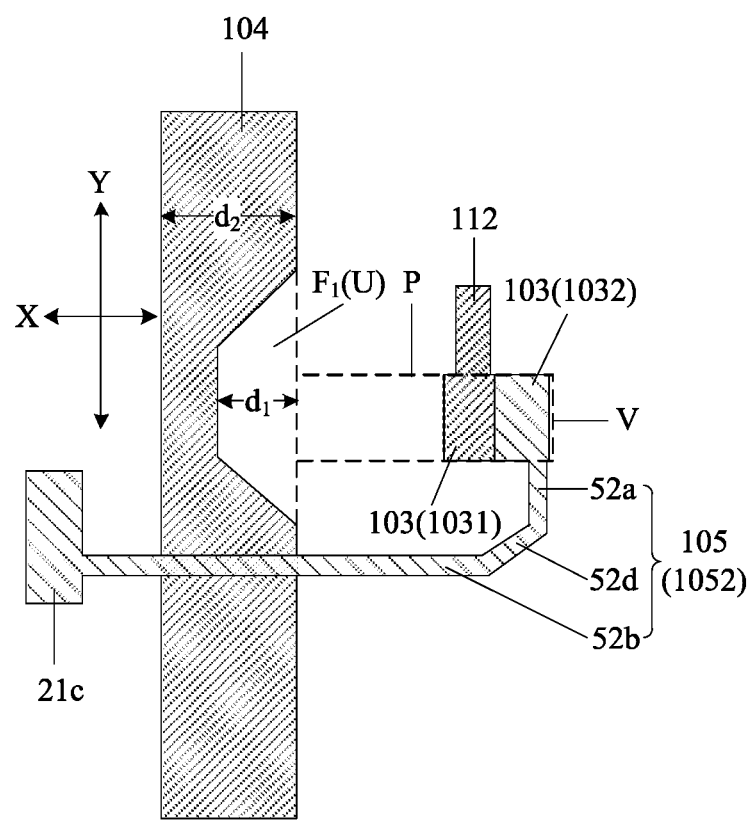
FIG. 23 is a schematic diagram of a projection relation between a first avoiding groove and a patch panel provided by an embodiment of the present disclosure.

In some embodiments, in the above display substrate provided by the embodiment of the present disclosure, as shown in FIG. 23, the patch panel 103 is located between the common electrode wire 104 and the display region AA, the common electrode wire 104 includes a first avoiding groove $F_1$, and the first voiding groove $F_1$ is concave in a direction facing away from the patch panel 103 so that avoidance of the gap S which is prone to generation of static electricity is realized through the first avoiding groove $F_1$. Optionally, the first avoiding groove $F_1$ is located on a side of the common electrode wire 104 close to the output transistor 102 and is concave in a direction facing the patch panel 103. An orthographic projection of the first avoiding groove $F_1$ on the base substrate 101 is a first pattern U, an orthographic projection of the patch panel 103 on the base substrate 101 is a second pattern V, and an orthographic projection of the first pattern U on an extension direction Y of the common electrode wire 104 and an orthographic projection of the second pattern V on the extension direction Y of the common electrode wire overlap each other. Because the common electrode wire 104 is close to the patch panel 103, static electricity is easily generated between the two; and by arranging the first avoiding groove $F_1$ on the common electrode wire 104, a distance between the common electrode wire 104 and the patch panel 103 is increased, so a probability of generation of static electricity is lowered. Optionally, a shape of the first pattern U may be a trapezoid as shown in FIG. 23, or may be other shapes (such as a rectangle), which is not limited herein.

In some embodiments, in the above display substrate provided by the embodiment of the present disclosure, as shown in FIG. 23, in order to lower the probability of generation of static electricity to the greatest extent, the orthographic projection of the first pattern U on the extension direction Y of the common electrode wire 104 may fully cover the orthographic projection of the second pattern V on the extension direction Y of the common electrode wire 104. Specifically, the orthographic projection of the second pattern V on the extension direction Y of the common electrode wire 104 may be located within an orthographic projection of a side (i.e., a bottom edge on a right side of the trapezoid shown in the figure) of the first pattern U close to the second pattern V on the extension direction Y of the common electrode wire 104; and the orthographic projection of the second pattern V on the extension direction Y of the common electrode wire 104 may be located within an orthographic projection of a side (i.e., a bottom edge on a left side of the trapezoid shown in the figure) of the first pattern U away from the second pattern V on the extension direction Y of the common electrode wire 104, or may overlap with the orthographic projection of a side (i.e., the bottom edge on the left side of the trapezoid shown in the figure) of the first pattern U away from the second pattern V on the extension direction Y of the common electrode wire 104, or may fully cover the orthographic projection of a side (i.e., the bottom edge on the left side of the trapezoid shown in the figure) of the first pattern U away from the second pattern V on the extension direction Y of the common electrode wire 104.

Figure 24:
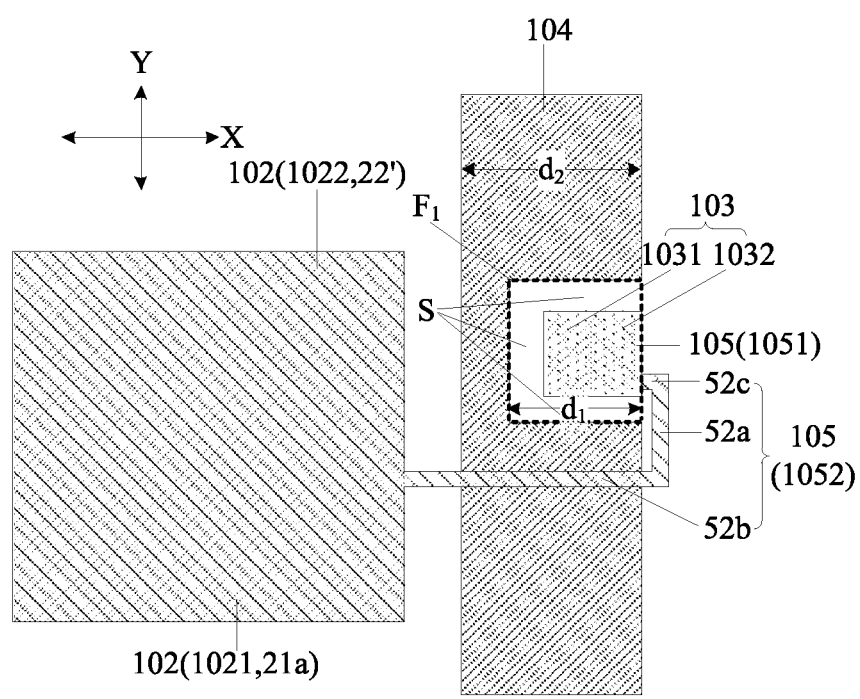
FIG. 24 is yet another schematic diagram of a connection of an output transistor and a patch panel provided by an embodiment of the present disclosure.

In some embodiments, in the above display substrate provided by the embodiment of the present disclosure, as shown in FIG. 24, the common electrode wire 104 includes the first avoiding groove $F_1$, and the first voiding groove $F_1$ is concave in a direction facing away from the display region AA; and the orthographic projection of the patch panel 103 on the base substrate 101 at least partially overlap with an orthographic projection of the first avoiding groove $F_1$ on the base substrate 101. Further, the orthographic projection of the patch panel 103 on the base substrate 101 is located within the orthographic projection of the first avoiding groove $F_1$ on the base substrate 101. Through the arrangement, the probability of generation of static electricity between the common electrode wire 104 and the patch panel 103 may be reduced, and narrow bezel design may be realized.

In some embodiments, the second sub jumper 1052 bypasses the first avoiding groove $F_1$, that is, the orthographic projection of the second sub jumper 1052 on the base substrate 101 and the orthographic projection of the first avoiding groove $F_1$ on the base substrate 101 do not overlap each other.

In some embodiments, in the above display substrate provided by the embodiment of the present disclosure, as shown in FIG. 23 and FIG. 24, a width $d_1$ of the first avoiding groove $F_1$ in a direction X perpendicular to the extension direction Y of the common electrode wire 104 is smaller than ½ of a wire width $d_2$ of the common electrode wire 104 on a non-avoiding-groove part. In this way, a risk of generation of static electricity may be effectively reduced and the common electrode wire 104 may be effectively prevented from breakage.

Optionally, because an overall resistance of the common electrode wire 104 is relatively small and a distance between the common electrode wire 104 and the patch panel 103 is relatively large, the width $d_1$ of the first avoiding groove $F_1$ may be designed to be 5%-30% of the wire width $d_2$ of the common electrode wire 104 on the non-avoiding-groove part. For example, the wire width $d_2$ of the common electrode wire 104 on the non-avoiding-groove part may be 153 μm, the width $d_1$ of the first avoiding groove $F_1$ may be 41 μm, and the width $d_1$ of the first avoiding groove $F_1$ accounts for 27% of the wire width $d_2$ of the common electrode wire 104 on the non-avoiding-groove part; the wire width $d_2$ of the non-avoiding-groove part of the common electrode wire 104 may be 103 μm, the width $d_1$ of the first avoiding groove $F_1$ is 31 μm, and the width $d_1$ of the first avoiding groove $F_1$ accounts for 30% of the wire width $d_2$ of the non-avoiding-groove part of the common electrode wire 104; the wire width $d_2$ of the non-avoiding-groove part of the common electrode wire 104 may be 213 μm, the width $d_1$ of the first avoiding groove $F_1$ is 14 μm, and the width $d_1$ of the first avoiding groove $F_1$ accounts for 7% of the wire width $d_2$ of the non-avoiding-groove part of the common electrode wire 104; or, the wire width $d_2$ of the non-avoiding-groove part of the common electrode wire 104 may be 154 μm, the width $d_1$ of the first avoiding groove $F_1$ is 22 μm, and the width $d_1$ of the first avoiding groove $F_1$ accounts for 14% of the wire width $d_2$ of the non-avoiding-groove part of the common electrode wire 104.

Figure 9:
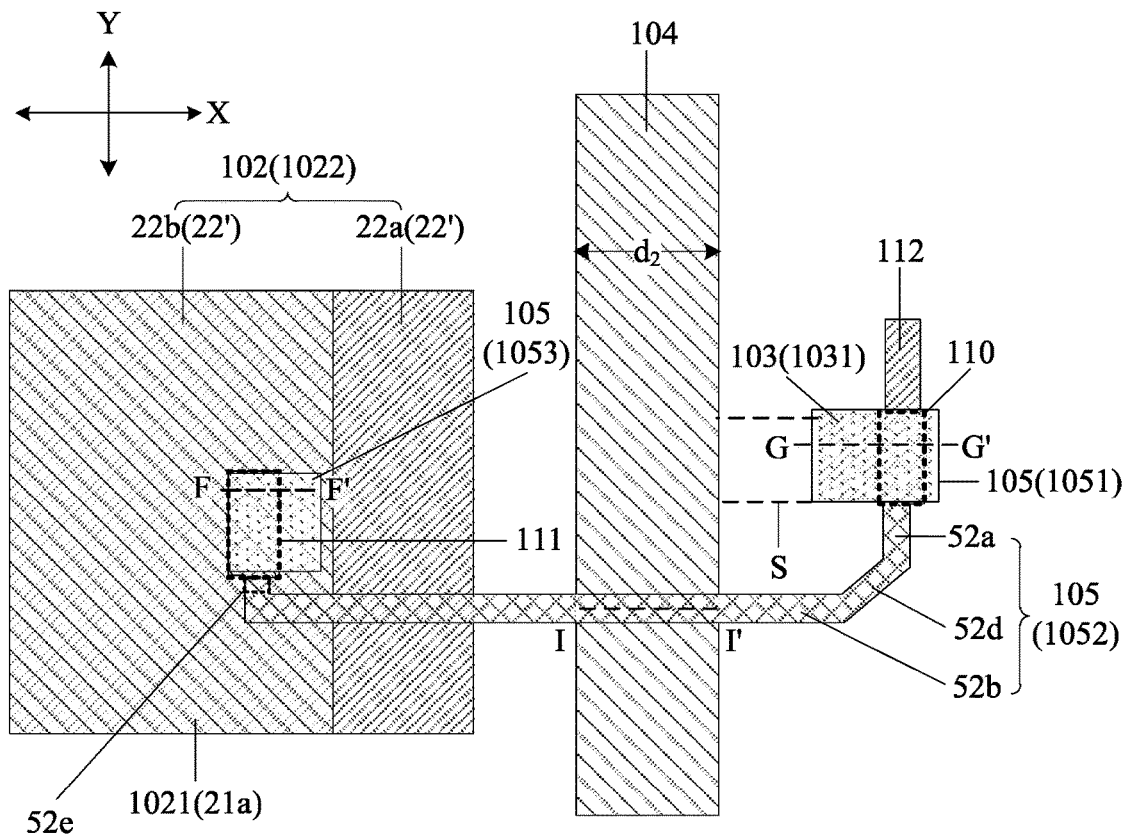
FIG. 9 is yet another schematic diagram of a connection of an output transistor and a patch panel provided by an embodiment of the present disclosure.
Figure 10:
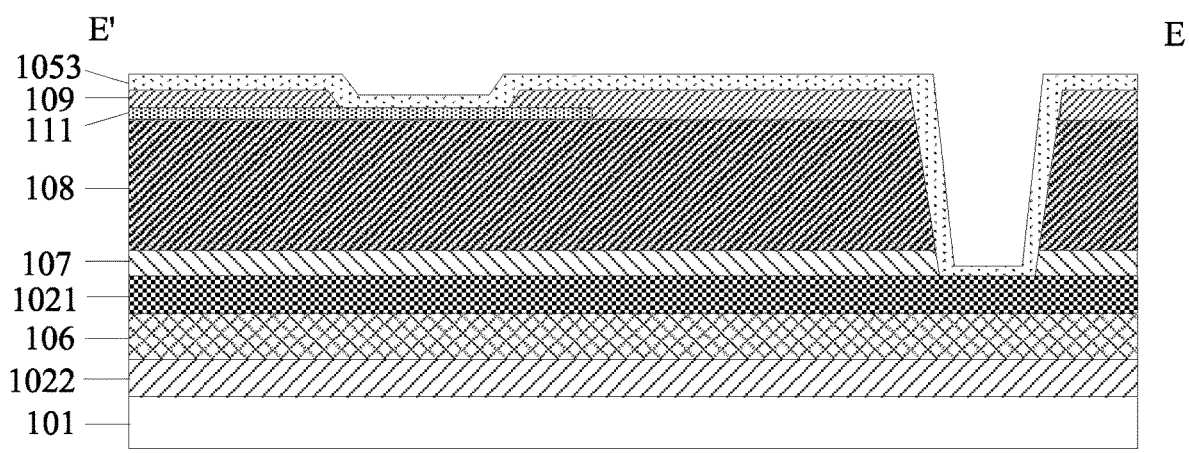
FIG. 10 is a sectional diagram along an E-E' line in FIG. 8.
Figure 11:
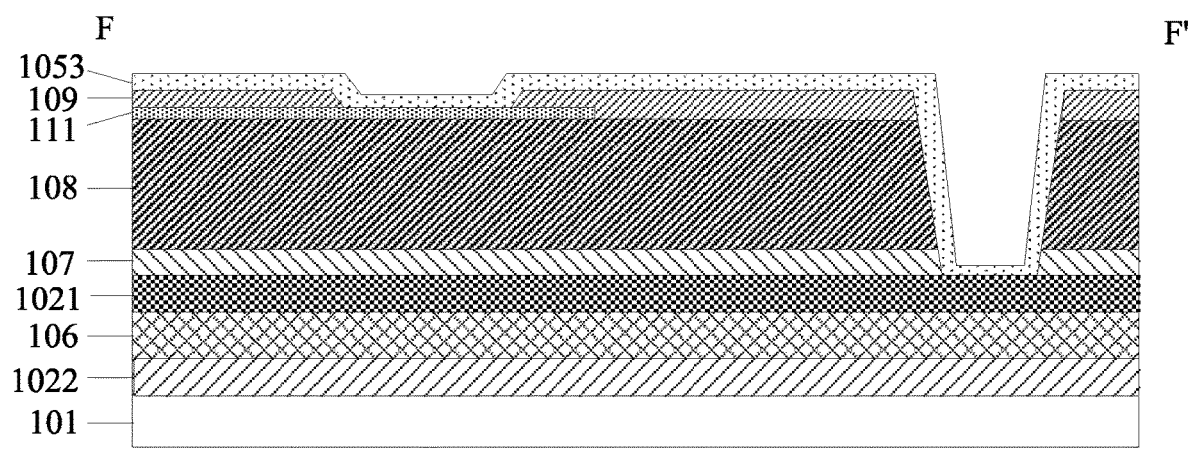
FIG. 11 is a sectional diagram along an F-F' line in FIG. 9.
Figure 12:
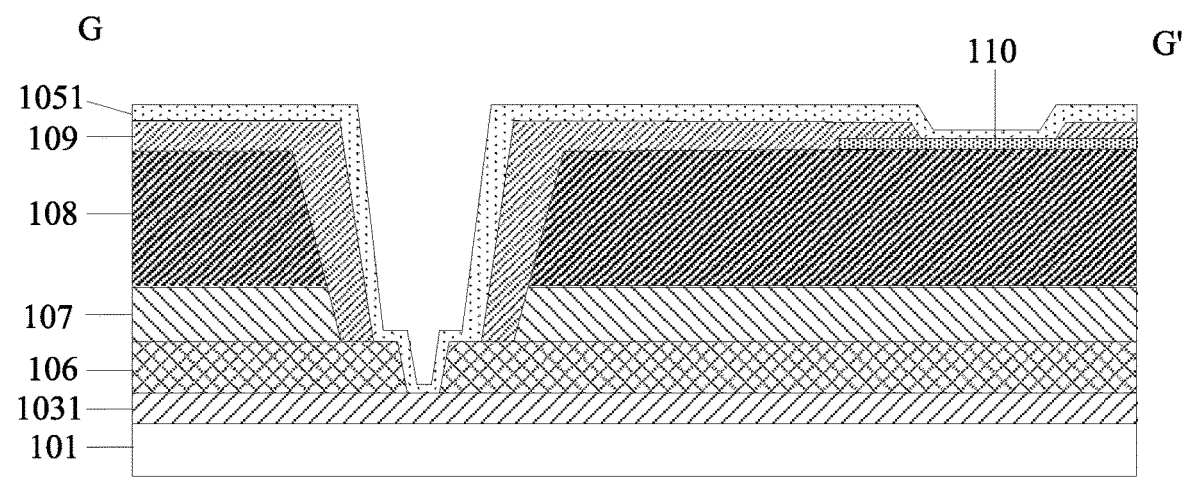
FIG. 12 is a sectional diagram along a G-G' line in FIG. 8 and FIG. 9.
Figure 13:
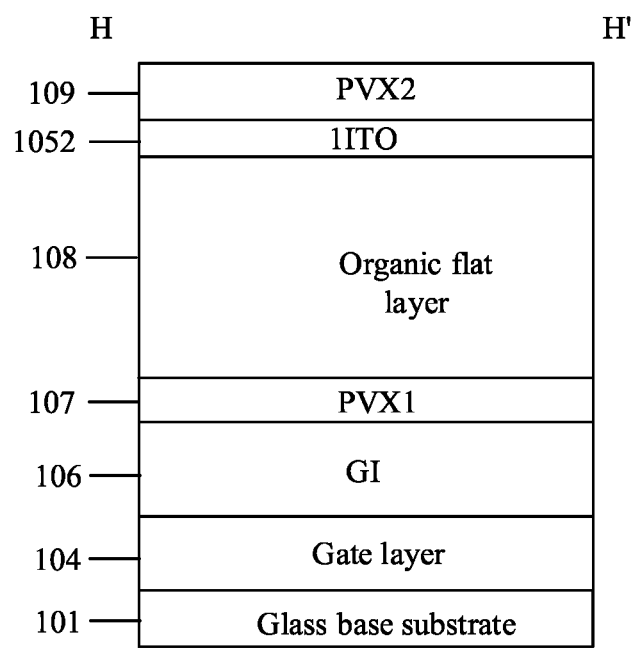
FIG. 13 is a sectional diagram along an H-H' line in FIG. 8.
Figure 14:
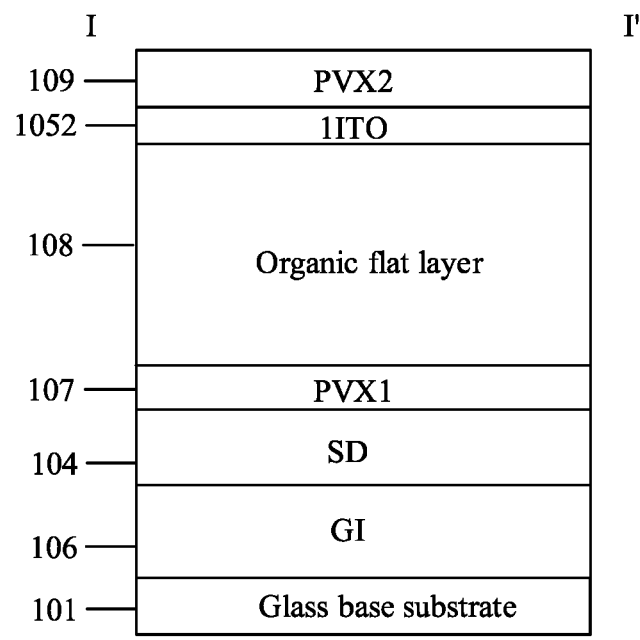
FIG. 14 is a sectional diagram along an I-I' line in FIG. 9.
Figure 18:
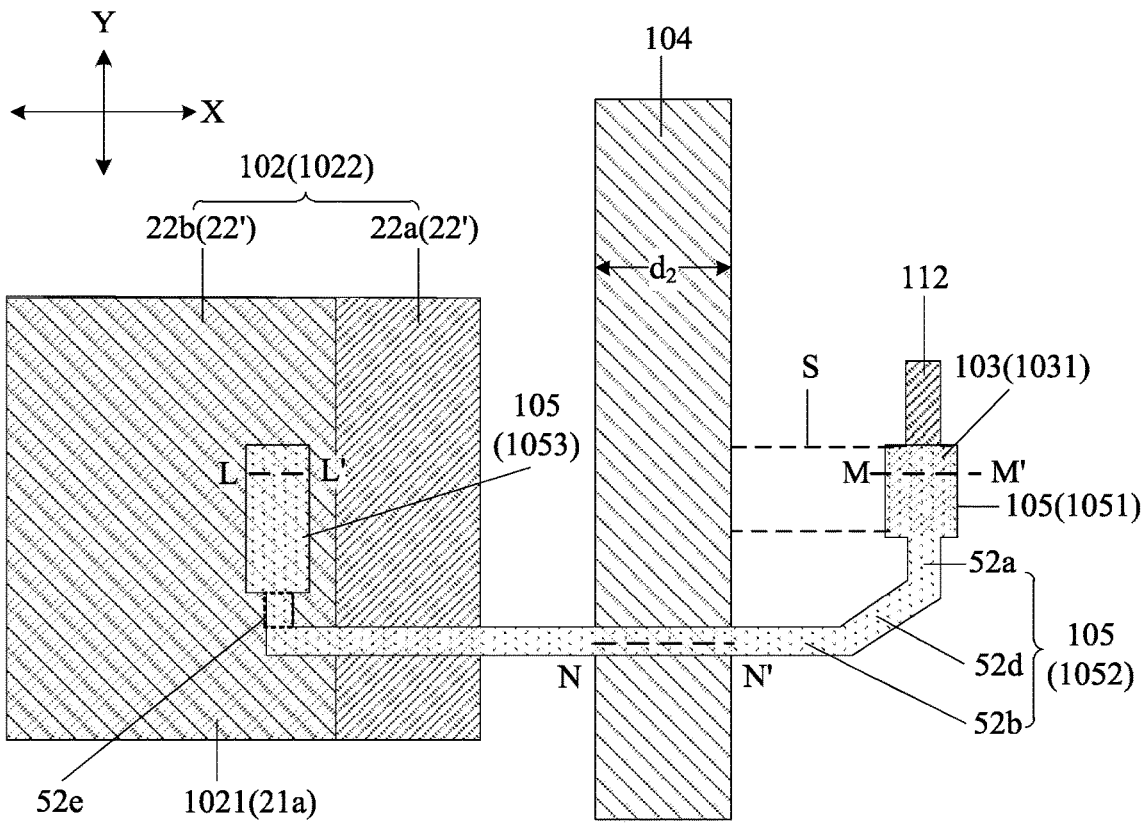
FIG. 18 is yet another schematic diagram of a connection of an output transistor and a patch panel provided by an embodiment of the present disclosure.
Figure 19:
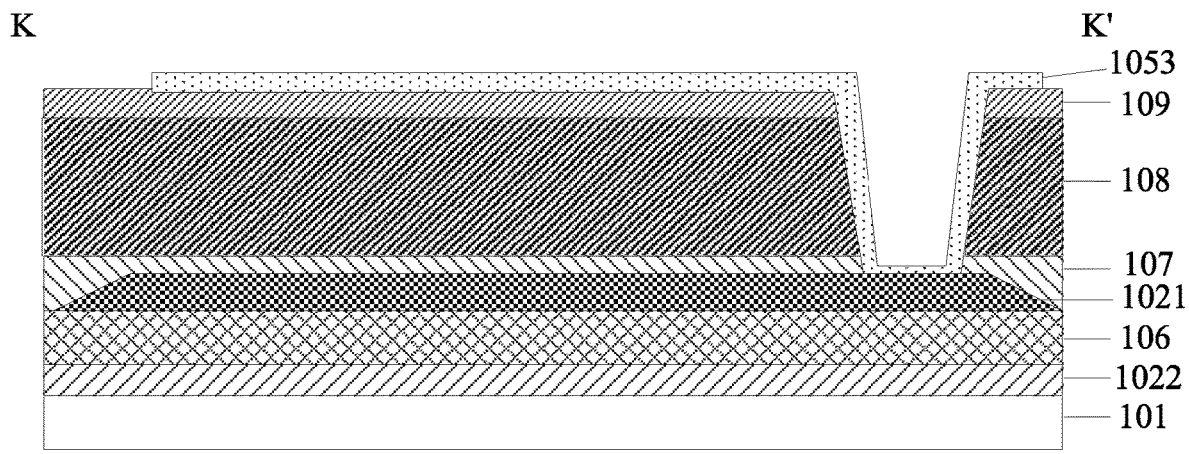
FIG. 19 is a sectional diagram along a K-K' line in FIG. 17.
Figure 20:
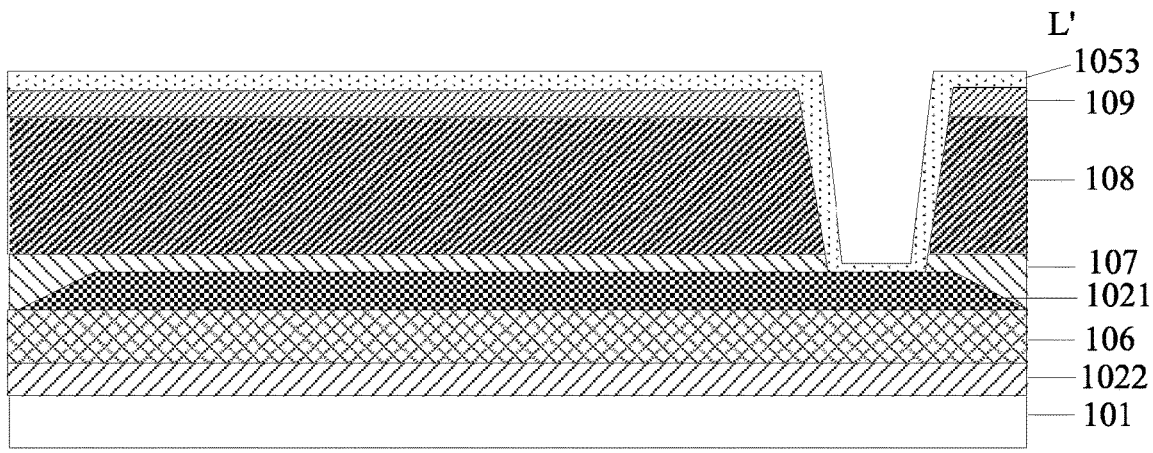
FIG. 20 is a sectional diagram along an L-L' line in FIG. 18.
Figure 21:
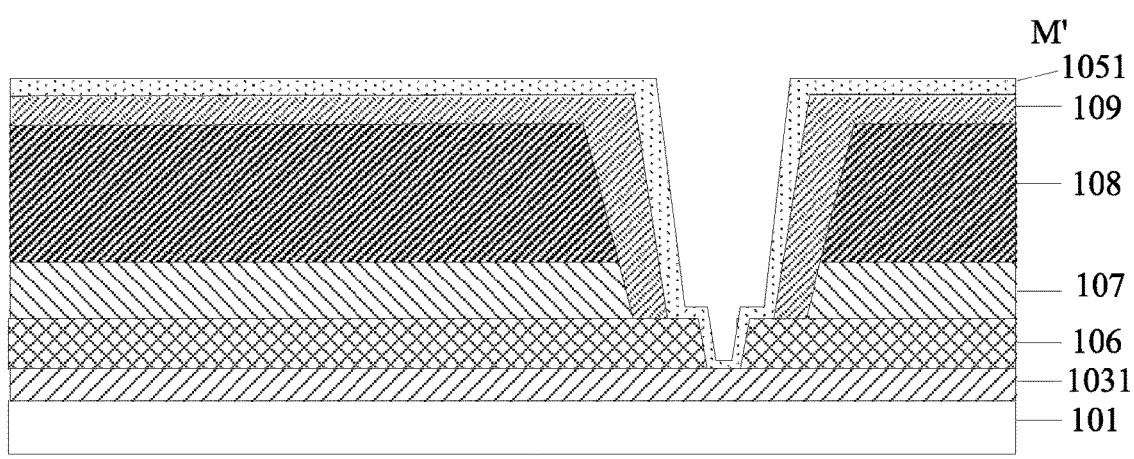
FIG. 21 is a sectional diagram along an M-M' line in FIG. 17 and FIG. 18.
Figure 22:
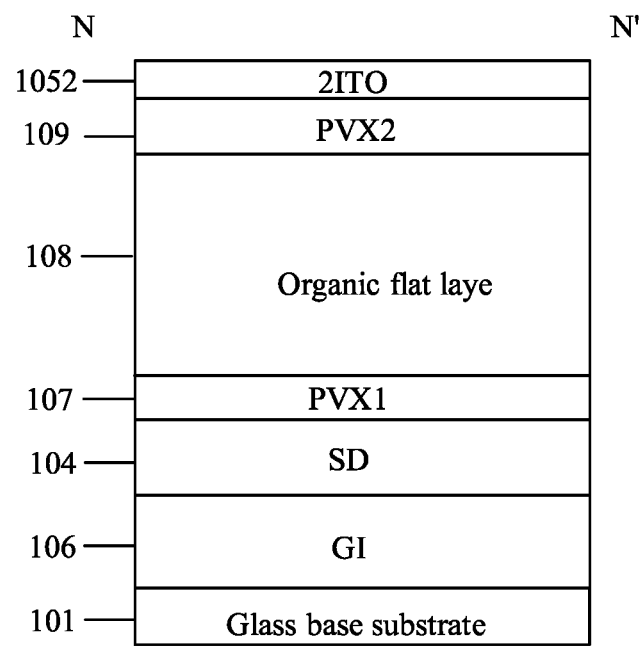
FIG. 22 is a sectional diagram along an N-N' line in FIG. 18.

In addition, as shown in FIG. 3, FIG. 9 and FIG. 18, if a main body width (equivalent to the wire width $d_2$ of the non-avoiding-groove part of the common electrode wire 104) of the common electrode wire 104 is smaller than or equal to 50 μm, no groove is formed in the common electrode wire 104. Because a grooving width of a black matrix (BM) at a corresponding position is 10 μm-30 μm, the common electrode wire 104 is needed for light shielding, so grooving cannot be performed. In consideration of a margin caused by process or other factors, the width of the common electrode wire 104 needs to be at least 50 μm so as to avoid poor light leak.

In some embodiments, in the above display substrate provided by the embodiment of the present disclosure, as shown in FIG. 2, FIG. 3, FIG. 8, FIG. 9, FIG. 15, FIG. 17, FIG. 18, FIG. 24 and FIG. 25, the first electrode 1021 of the output transistor 102 may include a main body part 21*a*, the gate 1022 of the output transistor 102 includes a coupling part 22', and due to limitations of a manufacturing process, an orthographic projection of the main body part 21*a* on the base substrate 101 and an orthographic projection of the coupling part 22' on the base substrate 101 overlap each other.

In some embodiments, in the above display substrate provided by the embodiment of the present disclosure, as shown in FIG. 2, FIG. 3, FIG. 8, FIG. 9, FIG. 15, FIG. 17 and FIG. 18, the coupling part 22' may include a first subsection 22a and a second subsection 22b which are integrally arranged, the first subsection 22a and the second subsection 22b extend along the extension direction Y of the common electrode wire 104, and the second subsection 22b is located on a side of the first subsection 22a away from the common electrode wire 104; and the orthographic projection of the main body part 21a on the base substrate 101 roughly coincides with an orthographic projection of the second subsection 22b on the base substrate 101, so a pattern of the main body part 21 a is relatively simple (for example, the rectangle shown in the figure) and facilitates the manufacturing of the output transistor 102.

It should be noted that, in the embodiment provided by the present disclosure, due to limitation of process and conditions or other factors such as measurement, "roughly coinciding" may be exactly coinciding, or there may be deviations (for example, a deviation of ±2 μm. Therefore, as long as a relation of "roughly coinciding" between relevant characteristics satisfies an allowance, such relation falls within the protection scope of the present disclosure.

In some embodiments, in the above display substrate provided by the embodiment of the present disclosure, as shown in FIG. 2, FIG. 3, FIG. 8, FIG. 15 and FIG. 17, the first electrode 1021 of the output transistor 102 may further include a protruding part 21b, the protruding part 21b and the main body part 21a are integrally arranged, and the protruding part 21b is located on a side of the main body part 21a adjacent to the common electrode wire 104. Through the arrangement of the protruding part 21b, a distance between the first electrode 1021 of the output transistor 102 and the patch panel 103 is reduced, so electrical connection between the first electrode 1021 of the output transistor 102 and the patch panel 103 may be realized through the shorter second sub jumper 1052. In this way, a resistance of the second sub jumper 1052 is reduced, which can reduce a loss of a scan signal provided by the output transistor 102 on a transmission route.

In some embodiments, in the above display substrate provided by the embodiment of the present disclosure, as shown in FIG. 2, FIG. 3, and FIG. 15, the jumper 103 further includes the third sub jumper 1053 located on the second transparent conducting layer (2ITO), the first electrode 1021 of the output transistor 102 may further include a separating part 21c, the separating part 21c is located on a side of the protruding part 21b adjacent to the common electrode wire 104, an orthographic projection of the separating part 21c on the base substrate 101 and an orthographic projection of the protruding part 21b on the base substrate 101 do not overlap each other, and the separating part 21c is connected to the protruding part 21b through the third sub jumper 1053. Through the arrangement of the separating part 21c, the distance between the first electrode 1021 of the output transistor 102 and the patch panel 103 is further reduced, so electrical connection between the first electrode 1021 of the output transistor 102 and the patch panel 103 may be realized through the shorter second sub jumper 1052. In this way, the resistance of the second sub jumper 1052 is reduced, which can reduce the loss of the scan signal provided by the output transistor 102 on the transmission route.

In addition, through the arrangement of the separating part 21c, the situation that in a manufacturing process of the display substrate, static electricity accumulating on the first electrode 1021 of the output transistor 102 is conducted to between the first electrode 1021 and the common electrode wire 104 and between the common electrode wire 104 and the patch panel 103 is avoided. Further, the first electrode 1021 of the output transistor 102 is separately designed, and the separating part 21c is connected until the second transparent conducting layer (2ITO) of the display substrate is manufactured in the last process, in other words, in the processes before the manufacture of the second transparent conducting layer (2ITO), the first electrode 1021 is cut off, so even if much static electricity accumulates on the first electrode 1021, the static electricity will not be conducted to between the first electrode 1021 and the common electrode wire 104 or between the common electrode wire 104 and the patch panel 103 due to a relatively large distance between the first electrode 1021 and the common electrode wire 104.

In some embodiments, in the above display substrate provided by the embodiment of the present disclosure, as shown in FIG. 2, FIG. 3, and FIG. 15, the first subsection 22a includes a second avoiding groove $F_2$, and the second avoiding groove $F_2$ is concave in the direction away from the patch panel 103; the orthographic projection of the protruding part 21b on the base substrate 101 is located within an orthographic projection of the first subsection 22a on the base substrate 101; and the orthographic projection of the separating part 21c on the base substrate 101 is located within an orthographic projection of the second avoiding groove $F_2$ on the base substrate 101. By arranging the second avoiding groove $F_2$ in a region where the separating part 21c is located, mutual intervention caused by coupling capacity between the separating part 21c and the gate 1022 of the output transistor 102 is avoided, a pattern of the gate 1022 is preserved in a region where the main body part 21a and the protruding part 21b are located, and the gate 1022 may be effectively prevented from breakage. In addition, due to existence of the second avoiding groove $F_2$, a distance between the gate 1022 of the output transistor 102 and the common electrode wire 104 is effectively increased, static electricity may be prevented between the two, thus preventing a short circuit at a position of the separating part 21a between the gate 1022 and the first electrode 1021 of the output transistor 102 and a short circuit between the second sub jumper 1052 and the common electrode wire 104. Optionally, a shape of the second avoiding groove $F_2$ may be the rectangle shown in FIG. 2, FIG. 3, and FIG. 15, or may be other shapes, which is not specifically limited herein.

Figure 25:
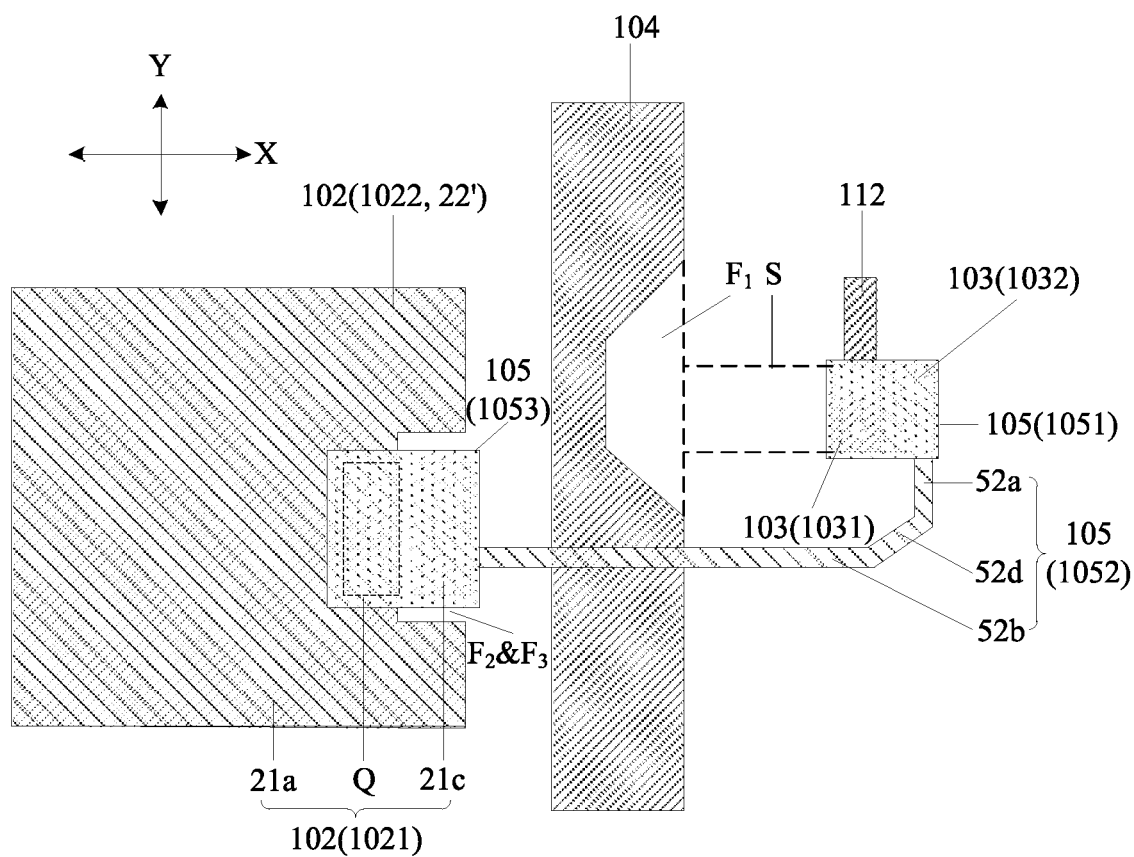
FIG. 25 is yet another schematic diagram of a connection of an output transistor and a patch panel provided by an embodiment of the present disclosure.

In some embodiments, in the above display substrate provided by the embodiment of the present disclosure, as shown in FIG. 24 and FIG. 25, the orthographic projection of the main body part 21a on the base substrate 101 roughly coincides with the orthographic projection of the coupling part 22' on the base substrate 101. That is, the two exactly coincide with each other, or coincide within an allowance.

In some embodiments, in the above display substrate provided by the embodiment of the present disclosure, as shown in FIG. 25, the jumper 103 further includes the third sub jumper 1053 located on the second transparent conducting layer (2ITO); the first electrode 1021 of the output transistor 102 further includes the separating part 21c; and the main body part 21a includes a connecting region Q, wherein the connecting region Q is located on a side of the separating part 21a away from the common electrode wire 104 and is adjacent to the separating part 21c, an orthographic projection of the separating part 21c on the base substrate 101 and an orthographic projection of the connecting region Q on the base substrate 101 do not overlap each other, and the separating part 21c is connected to the connecting region Q through the third sub jumper 1053. As mentioned above, through the arrangement of the separating part 21c, the loss of the scan signal provided by the output transistor 102 on the transmission route may be reduced, the static electricity accumulating on the first electrode 1021 of the output transistor 102 may be effectively prevented from being conducted to between the first electrode 1021 and the common electrode wire 104 and between the common electrode wire 104 and the patch panel 103.

In some embodiments, in the above display substrate provided by the embodiment of the present disclosure, as shown in FIG. 25, the coupling part 22' includes the second avoiding groove $F_2$, and the second avoiding groove $F_2$ is concave in the direction away from the patch panel 103; the main body part 21a includes a third avoiding groove $F_3$, and an orthographic projection of the third avoiding groove $F_3$ on the base substrate 101 roughly coincides, or exactly coincides, or coincides within an allowance, with an orthographic projection of the second avoiding groove $F_2$ on the base substrate 101; and the separating part 21c is located within the third avoiding groove $F_3$. As mentioned above, because of the existence of the second avoiding groove $F_2$, the distance between the gate 1022 of the output transistor 102 and the common electrode wire 104 is effectively increased, so the generation of static electricity may be prevented, thus preventing a short circuit at a position of the separating part 21a between the gate 1022 and the first electrode 1021 of the output transistor 102 and a short circuit between the second sub jumper 1052 and the common electrode wire 104. The orthographic projection of the third avoiding groove $F_3$ roughly coincides with that of the second avoiding groove $F_2$, and the separating part 21a is arranged within the third avoiding groove $F_3$, so the coupling capacity between the first electrode 1021 and the gate 1022 of the output transistor 102 may be reduced to a certain extent, thus improving performance of the base substrate.

Optionally, the orthographic projection of the first avoiding groove $F_1$ on the base substrate 101 is the first pattern, the orthographic projection of the third avoiding groove $F_3$ on the base substrate 101 is a third pattern, the orthographic projection of the second avoiding groove $F_2$ on the base substrate 101 is a fourth pattern, and an orthographic projection of the first pattern on the extension direction Y of the common electrode wire 104 and the orthographic projections of the third pattern/fourth pattern on the extension direction Y of the common electrode wire 104 overlap with each other.

Figure 26:
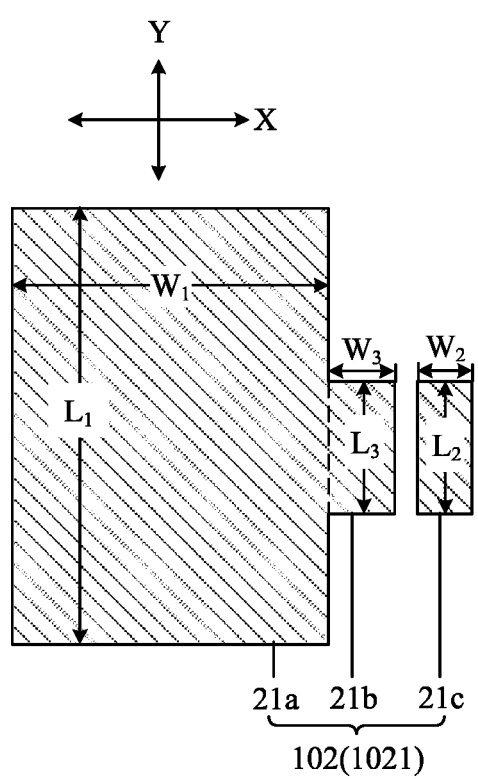
FIG. 26 is a schematic structural diagram of a first electrode of an output transistor provided by an embodiment of the present disclosure.
Figure 27:
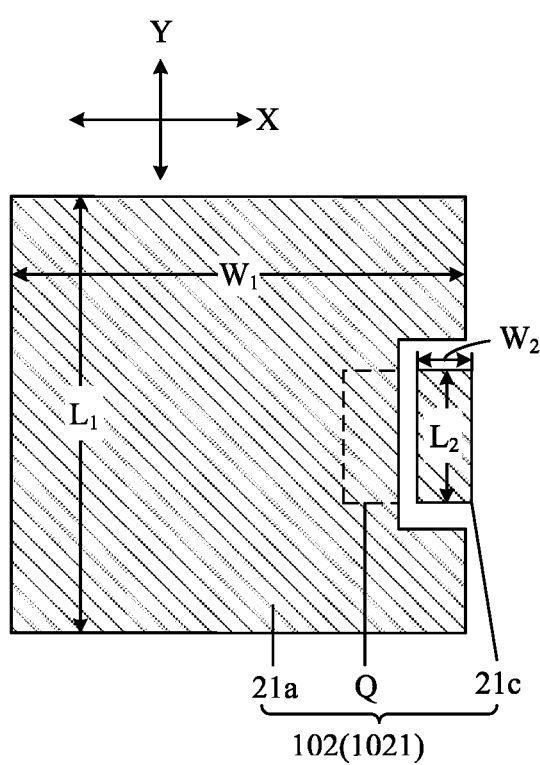
FIG. 27 is yet another schematic structural diagram of a first electrode of an output transistor provided by an embodiment of the present disclosure.

In some embodiments, in the above display substrate provided by the embodiment of the present disclosure, as shown in FIG. 26 and FIG. 27, in the extension direction Y of the common electrode wire 104, a length $L_1$ of the main body part 21a is greater than a length $L_2$ of the separating part 21c, and in the direction X perpendicular to the extension direction Y of the common electrode wire 104, a width $W_1$ of the main body part 21a is greater than a width $W_2$ of the separating part 21c. Through the arrangement, the separating part 21c is easily connected to the main body part 21a through the third sub jumper 1053, and the first electrode 1021 of the output transistor 102 occupies a relatively small space, thus facilitating a narrow bezel design.

Optionally, as shown in FIG. 26, in order that the separating part 21c is connected to the protruding part 21b through the third sub jumper 1053, on the extension direction Y of the common electrode wire 104, a length $L_3$ of the protruding part 21b may be roughly equal to the length $L_2$ of the separating part 21c. That is, the length $L_3$ of the protruding part 21b may be equal to the length $L_2$ of the separating part 21c, or a difference between the length $L_3$ of the protruding part 21b and the length $L_2$ of the separating part 21c may be within an allowance caused by measurement or a manufacturing process, for example, the difference between the length $L_3$ of the protruding part 21b and the length $L_2$ of the separating part 21c may be smaller than or equal to 5% of the length $L_2$ of the separating part 21c. In some embodiments, a width $W_3$ of the protruding part 21b is smaller than the width $W_1$ of the main body part 21a, and the width $W_3$ of the protruding part 21b may be equal to or different from the width $W_2$ of the separating part 21c, which is not limited herein.

In some embodiments, the length $L_2$ of the separating part 21c may be 25%-30% of the length $L_1$ of the main body part 21a, the width $W_2$ of the separating part 21c may be 10%-15% of the width $W_1$ of the main body part 21a. For example, the length $L_1$ of the main body part 21a is 196 μm and the width $W_1$ is 150 μm; both the length $L_2$ of the separating part 21c and the length $L_3$ of the protruding part 21b are 50 μm, the width $W_2$ of the separating part 21c is 17 μm, at the moment, the length $L_2$ of the separating part 21c is 26% of the length $L_1$ of the main body part 21a, and the width $W_2$ of the separating part 21c is 11% of the width $W_1$ of the main body part 21a. For another example, the length $L_1$ of the main body part 21a is 262 μm and the width $W_1$ is 121 μm; both the length $L_2$ of the separating part 21c and the length $L_3$ of the protruding part 21b are 68 μm, the width $W_2$ of the separating part 21c is 15 μm, at the moment, the length $L_2$ of the separating part 21c is 26% of the length $L_1$ of the main body part 21a, and the width $W_2$ of the separating part 21c is 12% of the width $W_1$ of the main body part 21a.

In some embodiments, in the above display substrate provided by the embodiment of the present disclosure, as shown in FIG. 2, FIG. 3, FIG. 8, FIG. 9, FIG. 15, FIG. 17, FIG. 18, FIG. 23, FIG. 24, FIG. 25, FIG. 28 and FIG. 29, the second sub jumper 1052 may include a first wire 52a and a second wire 52b, the first wire 52a is roughly parallel (exactly parallel, or within an allowance, for example, an included angle is smaller than or equal to) 5° to the common electrode wire 104, and the second wire 52b is roughly perpendicular (exactly perpendicular, or within an allowance, for example, a difference from a 90° included angle is smaller than or equal to 5°) to the common electrode wire 104. In other words, the first wire 52a extends in the extension direction Y of the common electrode wire 104, and the second wire 52b extends in the direction X perpendicular to the extension direction Y of the common electrode wire 104. The first wire 52a is located on a side (for example, a lower side shown in the figure, or an upper side shown in the figure) of the patch panel 103 on the direction X perpendicular to the extension direction Y of the common electrode wire 104, the first wire 52a connects the first sub jumper 1051 and the second wire 52b, and the second wire 52a connects the first electrode 1021 of the output transistor 102. In this way, the second sub jumper 1052 winds from an upper side or a lower side of the patch panel 103 to be electrically connected to the first electrode 1021 of the output transistor 102, so the second sub jumper 1052 is prevented from being affected by static electricity that may be generated at the gap S between the common electrode wire 104 and the first sub patch panel 1031 (i.e., a left side of the first sub patch panel 1031).

Figure 28:
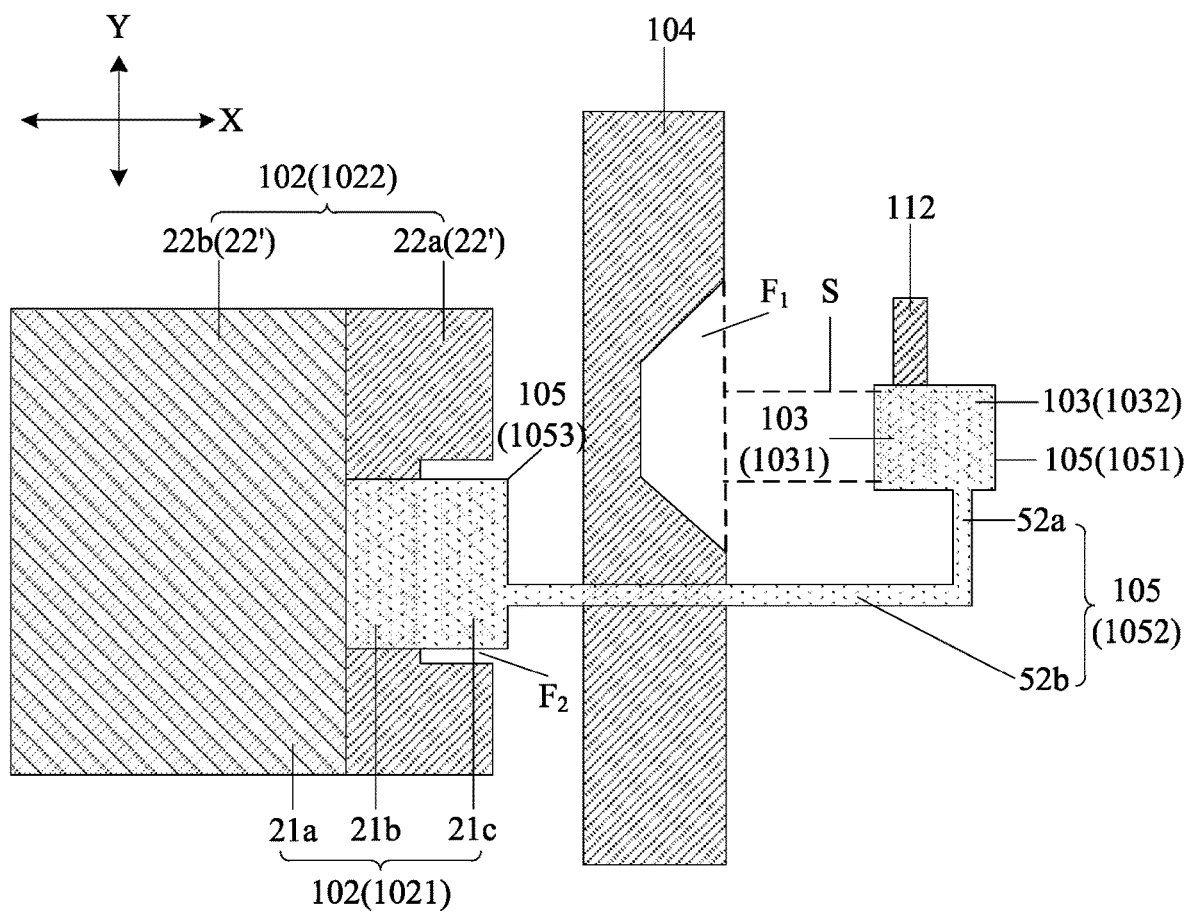
FIG. 28 is yet another schematic diagram of a connection of an output transistor and a patch panel provided by an embodiment of the present disclosure.
Figure 29:
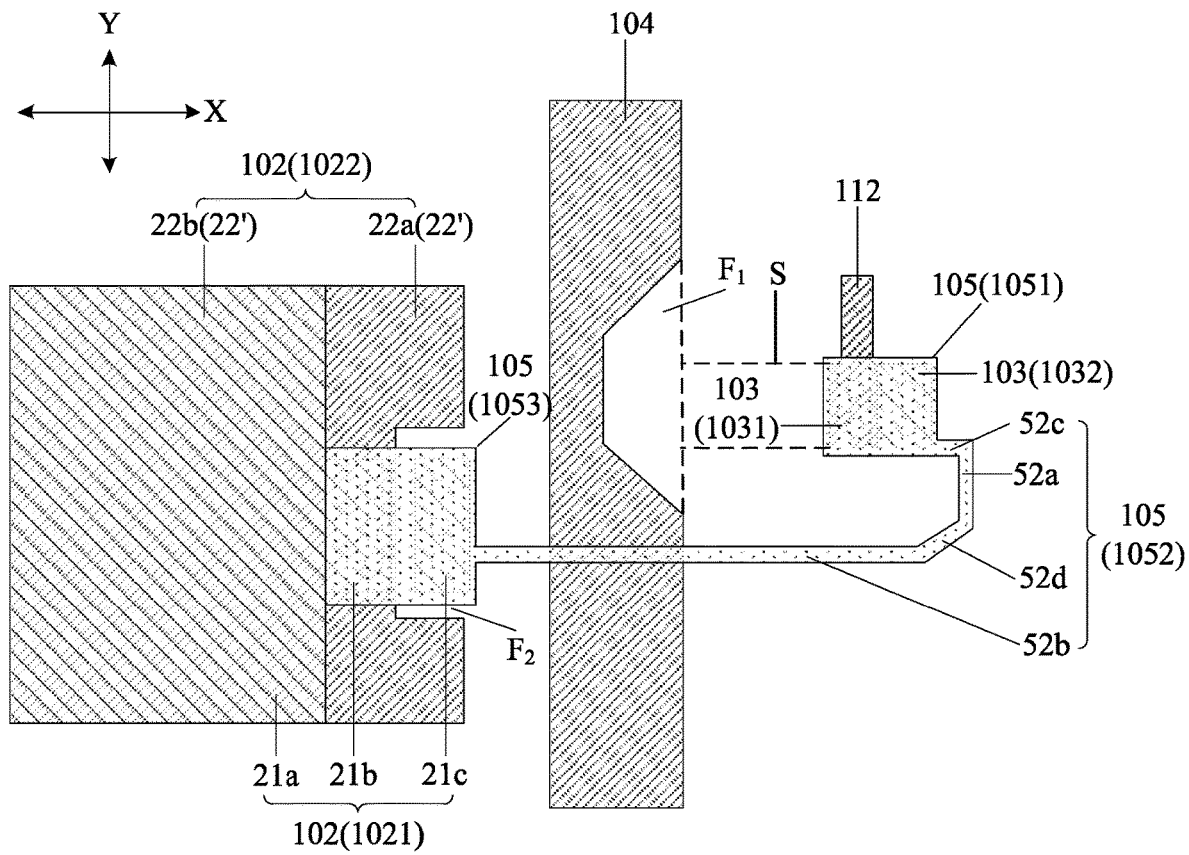
FIG. 29 is yet another schematic diagram of a connection of an output transistor and a patch panel provided by an embodiment of the present disclosure.

In some embodiments, in the above display substrate provided by the embodiment of the present disclosure, as shown in FIG. 24 and FIG. 29, the second sub jumper 1052 may further include a third wire 52c, the third wire 52c is located on a side of the patch panel 103 away from the common electrode wire 104, and the third wire 52c connects the first wire 52a and the first sub jumper 1051. In this case, the second sub jumper 1052 winds from a right side of the patch panel 103 to be electrically connected to the first electrode 1021 of the output transistor 102, so the second sub jumper 1052 is prevented from being affected by static electricity that may be generated at the gap S between the common electrode wire 104 and the first sub patch panel 1031 (i.e., a left side of the first sub patch panel 1031). In addition, as shown in FIG. 28, for the convenience of manufacturing, the third wire 52c may extend in the direction X perpendicular to the extension direction Y of the common electrode wire 104.

In some embodiments, in the above display substrate provided by the embodiment of the present disclosure, as shown in FIG. 2, FIG. 3, FIG. 8, FIG. 9, FIG. 15, FIG. 17, FIG. 18, FIG. 23, FIG. 25 and FIG. 29, for better avoidance from the gap S prone to generation of static electricity, the second sub jumper 1052 may further include a fourth wire 52d, the fourth wire 52d is arranged on the same side (for example, both on a lower side of the patch panel 103) of the patch panel 103 as the first wire 52a, an included angle between the fourth wire 52d and the extension direction of the common electrode wire 104 is an acute angle (which may be 30°-60°, preferably) 45°, and the fourth wire 52d connects the first wire 52a and the second wire 52b. Optionally, the fourth wire 52d may be a straight line or an arc, which is not limited herein.

In some embodiments, in the above display substrate provided by the embodiment of the present disclosure, as shown in FIG. 8, FIG. 9, FIG. 17 and FIG. 18, the second sub jumper 1052 may further include a fifth wire 52e, the fifth wire 52e is roughly parallel (exactly parallel, or within an allowance, for example, an included angle is smaller than or equal to) 5° to the common electrode wire 104, and the fifth wire 52e connects the second wire 52b and the third sub jumper 1053. The fifth wire 52e may further increase the distance from the second sub jumper 1052 to the gap S prone to generation of static electricity, thus further preventing a short circuit between the second sub jumper 1052 and the common electrode wire 104 caused by static electricity. Optionally, the fifth wire 52e is located on the side of the output transistor 102 close to the common electrode wire 104, and an included angle between the fifth wire 52e and the common electrode wire 104 is an acute angle (which may be 30°-60°, preferably) 45°, and the fifth wire 52e may be a straight line or an arc. Further, the second sub jumper 1052 may further include a sixth wire, the sixth wire is roughly (exactly perpendicular, or within an allowance, for example, a difference from a 90° included angle is smaller than or equal to) 5° perpendicular to the common electrode wire 104, and the sixth wire connects the fifth wire 52e and the first electrode 1021 of the output transistor 102.

In some embodiments, as shown in FIG. 2, FIG. 3, FIG. 8, FIG. 9, FIG. 15, FIG. 17, FIG. 18, FIG. 23, FIG. 25, FIG. 28 and FIG. 29, the above display substrate provided by the embodiment of the present disclosure may further include a gate connecting wire 112, the gate connecting wire 112 may be roughly parallel (exactly parallel, or within an allowance, for example, an included angle is smaller than or equal to) 5° to the first wire 52a, and the gate connecting wire 112 is electrically connected to the first sub patch panel 1031. Optionally, the gate connecting wire 112 may be located on the layer where the gate 1022 of the output transistor 102 is located and is connected between the first sub patch panel 1031 and a gate line, so that the gate connecting wire 112 transmits the scan signal to the gate line. The gate line may extend in the direction X perpendicular to the extension direction Y of the common electrode wire 104.

It should be noted that, the second sub jumper 1052 may not only be arranged in the above wiring mode in the present disclosure, but also, be flexibly arranged according to an actual wiring space in specific implementation as long as the gap S between the common electrode wire 104 and the first sub patch panel 1031 is avoided, which is not limited herein.

Figure 30:
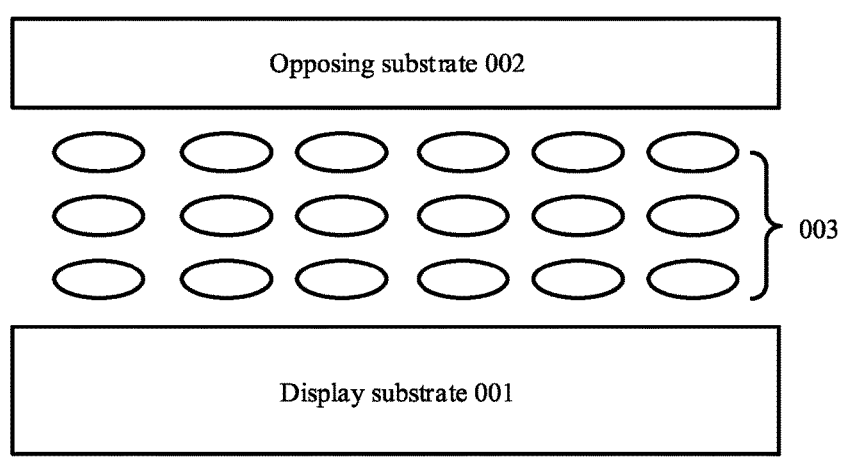
FIG. 30 is a schematic structural diagram of a display device provided by an embodiment of the present disclosure.

Based on the same inventive concept, an embodiment of the present disclosure provides a display device, as shown in FIG. 30, including the above display substrate 001 provided by the embodiment of the present disclosure. Because a problem solving principle of the device is similar to a problem solving principle of the above display substrate, implementation of the display device provided by the embodiment of the present disclosure, may refer to implementation of the above display substrate provided by the embodiment of the present disclosure, and repetition will not be made.

In some embodiments, as shown in FIG. 30, the above display device provided by the embodiment of the present disclosure may further include: an opposing substrate 002 and a liquid crystal layer 003, wherein the opposing substrate 002 is arranged opposite to the display substrate 001, and the liquid crystal layer 003 is located between the opposing substrate 002 and the display substrate 001. In some embodiments, the liquid crystal layer 003 may be limited, through a frame sealant, to a space defined by the opposing substrate 002 and the display substrate 001.

In some embodiments, in the above display device provided by the embodiment of the present disclosure, the first transparent conducting layer (1ITO) and the second transparent conducting layer (2ITO) may both be arranged on the display substrate 001, and at the moment, the display device is an advanced dimension switch (ADS) type liquid crystal display device; or the first transparent conducting layer (1ITO) and the second transparent conducting layer (2ITO) may be arranged on the display substrate 001 and the opposing substrate 002 respectively, and at the moment, the display device is a twisted nematic (TN) type liquid crystal display device.

In some embodiments, the above display device provided by the embodiment of the present disclosure may be: mobile phones, tablet computers, televisions, displayers, notebook computers, digital photo frames, navigators, smart watches, fitness wristbands, personal digital assistants, and any other products or parts with a display function. The display device includes but is not limited to: a radio frequency unit, a network module, an audio output & input unit, a sensor, a display unit, a user input unit, an interface unit, a memory, a processor, and a power supply and other components. In addition, those skilled in the art may understand that the above structure does not constitute a limitation on the display device provided by the embodiment of the present disclosure. In other words, the display device provided by the embodiment of the present disclosure may include more or fewer of the above parts, or combine certain parts, or arrange different parts.

Apparently, those of skill in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

What is claimed is:

1. A display substrate, comprising:
   a base substrate, comprising a display region and a bezel region located on at least one side of the display region;
   a shift register, located in the bezel region and comprising an output transistor, wherein a first electrode of the output transistor is an output end of the shift register;
   a patch panel, located between the shift register and the display region and comprising a first sub patch panel, wherein the first sub patch panel is arranged on a layer same as a layer where a gate of the output transistor is;
   a common electrode wire, located between the shift register and the display region, wherein a gap exists between the common electrode wire and the patch panel; and
   a jumper, located in the bezel region and comprising a first sub jumper and a second sub jumper, wherein the first sub jumper is located on a side, away from the base substrate, of a layer where the output transistor is, and the second sub jumper is arranged on a layer different from a layer where the first sub patch panel is; and an orthographic projection of the first sub jumper on the base substrate and an orthographic projection of the first sub patch panel on the base substrate overlap each other, an orthographic projection of the second sub jumper on the base substrate and an orthographic projection of the gap on the base substrate do not overlap each other, the first sub jumper connects the first sub patch panel and the second sub jumper, and the second sub jumper is connected to the first electrode of the output transistor.

2. The display substrate according to claim 1, further comprising: a second transparent conducting layer located on the side, away from the base substrate, of the layer where the output transistor is, wherein the first sub jumper is located on the second transparent conducting layer.

3. The display substrate according to claim 2, wherein the jumper further comprises a third sub jumper, an orthographic projection of the third sub jumper on the base substrate and an orthographic projection of the first electrode of the output transistor on the base substrate overlap each other, and the third sub jumper connects the second sub jumper and the first electrode of the output transistor;
   wherein the third sub jumper is located on the second transparent conducting layer.

4. The display substrate according to claim 3, further comprising: a first transparent conducting layer mutually insulated from the second transparent conducting layer, wherein the first transparent conducting layer is located between the layer where the output transistor is and the second transparent conducting layer, and the second sub jumper is located on the first transparent conducting layer.

5. The display substrate according to claim 3, wherein the second sub jumper is located on the second transparent conducting layer, and the first sub jumper, the second sub jumper, and the third sub jumper are integrally arranged.

6. The display substrate according to claim 1, wherein the second sub jumper is arranged on a layer same as a layer where the first electrode of the output transistor is.

7. The display substrate according to claim 5, wherein the common electrode wire is arranged on a layer same as a layer where the first electrode of the output transistor is.

8. The display substrate according to claim 5, wherein the patch panel further comprises a second sub patch panel, the second sub patch panel is arranged on a layer same as a layer where the first electrode of the output transistor is, and the second sub patch panel is located on a side away from the common electrode wire, of the first sub patch panel.

9. The display substrate according to claim 8, wherein an orthographic projection of the second sub patch panel on the base substrate is located within the orthographic projection of the first sub jumper on the base substrate, and the second sub patch panel is electrically connected to the first sub patch panel through the first sub jumper.

10. The display substrate according to claim 1, wherein the patch panel is located between the common electrode wire and the display region, the common electrode wire comprises a first avoiding groove, and the first avoiding groove is concave in a direction facing away from the patch panel;
    wherein the orthographic projection of the second pattern on an extension direction of the common electrode wire is located within an orthographic projection of a side of the first pattern adjacent to the second pattern on the extension direction of the common electrode wire.

11. The display substrate according to claim 10, wherein a width of the first avoiding groove in a direction perpendicular to the extension direction of the common electrode wire is smaller than ½ of a wire width of the common electrode wire on a non-avoiding-groove part.

12. The display substrate according to claim 1, wherein the first electrode of the output transistor comprises a main body part, the gate of the output transistor comprises a coupling part, and an orthographic projection of the main body part on the base substrate and an orthographic projection of the coupling part on the base substrate overlap each other.

13. The display substrate according to claim 12, wherein the coupling part comprises a first subsection and a second subsection which are integrally arranged, the first subsection and the second subsection extend in the extension direction of the common electrode wire, and the second subsection is located on a side away from the common electrode wire, of the first subsection; and
    the orthographic projection of the main body part on the base substrate roughly coincides with an orthographic projection of the second subsection on the base substrate.

14. The display substrate according to claim 13, wherein the first electrode of the output transistor further comprises a protruding part, the protruding part and the main body part are integrally arranged, and the protruding part is located on a side adjacent to the common electrode wire, of the main body part;
    wherein the display substrate further comprises the second transparent conducting layer located on the side, away from the base substrate, of the layer where the output transistor is, wherein the jumper further comprises the third sub jumper located on the second transparent conducting layer; and
    the first electrode of the output transistor further comprises a separating part, wherein the separating part is located on a side adjacent to the common electrode wire, of the protruding part, an orthographic projection of the separating part on the base substrate and an orthographic projection of the protruding part on the base substrate do not overlap each other, and the separating part is connected to the protruding part through the third sub jumper.

15. The display substrate according to claim 14, wherein the first subsection comprises a second avoiding groove, and the second avoiding groove is concave in the direction away from the patch panel;

the orthographic projection of the protruding part on the base substrate is located within an orthographic projection of the first subsection on the base substrate; and the orthographic projection of the separating part on the base substrate is located within an orthographic projection of the second avoiding groove on the base substrate.

16. The display substrate according to claim 12, further comprising the second transparent conducting layer located on the side, away from the base substrate, of the layer where the output transistor is, wherein the jumper further comprises the third sub jumper located on the second transparent conducting layer;

the first electrode of the output transistor further comprises a separating part; and the main body part comprises a connecting region, wherein the connecting region is located on a side away from the common electrode wire, of the separating part and is adjacent to the separating part, an orthographic projection of the separating part on the base substrate and an orthographic projection of the connecting region on the base substrate do not overlap each other, and the separating part is connected to the connecting region through the third sub jumper.

17. The display substrate according to claim 16, wherein the coupling part comprises a second avoiding groove, and the second avoiding groove is concave in the direction away from the patch panel; the main body part comprises a third avoiding groove, and an orthographic projection of the third avoiding groove on the base substrate roughly coincides with an orthographic projection of the second avoiding groove on the base substrate; and the orthographic projection of the separating part on the base substrate is located within the orthographic projection of the third avoiding groove on the base substrate.

18. The display substrate according to claim 1, wherein the second sub jumper comprises a first wire and a second wire, the first wire is roughly parallel to the common electrode wire, and the second wire is roughly perpendicular to the common electrode wire; and the first wire is located on a side perpendicular to the extension direction of the common electrode wire, of the patch panel, the first wire connects the first sub jumper and the second wire, and the second wire is connected to the first electrode of the output transistor.

19. The display substrate according to claim 18, wherein the second sub jumper further comprises a third wire, the third wire is located on a side away from the common electrode wire, of the patch panel, and the third wire connects the first wire and the first sub jumper;

wherein the second sub jumper further comprises a fourth wire, the fourth wire and the first wire are arranged on the same side of the patch panel an included angle between the fourth wire and the extension direction of the common electrode wire is an acute angle, and the fourth wire connects the first wire and the second wire.

20. A display device, comprising the display substrate according to claim 1.

* * * * *